United States Patent
Kim et al.

(10) Patent No.: US 10,122,448 B2
(45) Date of Patent: Nov. 6, 2018

(54) MOBILE TERMINAL AND CONTROL METHOD THEREFOR

(71) Applicant: LG ELECTRONICS INC., Seoul (KR)

(72) Inventors: Kiwan Kim, Seoul (KR); Jiyen Son, Seoul (KR); Sungjin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 5 days.

(21) Appl. No.: 15/503,562

(22) PCT Filed: Jun. 8, 2015

(86) PCT No.: PCT/KR2015/005716
§ 371 (c)(1),
(2) Date: Feb. 13, 2017

(87) PCT Pub. No.: WO2016/024707
PCT Pub. Date: Feb. 18, 2016

(65) Prior Publication Data
US 2017/0230114 A1    Aug. 10, 2017

(30) Foreign Application Priority Data

Aug. 14, 2014  (KR) ......................... 10-2014-0106138

(51) Int. Cl.
*H04B 10/114*  (2013.01)
*H04B 1/40*   (2015.01)
*H04N 5/232*  (2006.01)

(52) U.S. Cl.
CPC ........... *H04B 10/1143* (2013.01); *H04B 1/40* (2013.01); *H04N 5/23219* (2013.01); *H04N 5/23293* (2013.01)

(58) Field of Classification Search
CPC .. H04B 10/1143; H04B 1/40; H04N 5/23219; H04N 5/23293

(Continued)

(56) References Cited

U.S. PATENT DOCUMENTS 5,636,264 A * 6/1997 Sulavuori .......... H04B 10/1143
                                                370/273
6,104,512 A * 8/2000 Batey, Jr. .......... H04B 10/1143
                                                340/7.54

(Continued)

FOREIGN PATENT DOCUMENTS

KR   10-2008-0048348 A   6/2008
KR   10-2009-0035239 A   4/2009

(Continued)

*Primary Examiner* — Juan A Torres
(74) *Attorney, Agent, or Firm* — Birch, Stewart, Kolasch & Birch, LLP

(57) ABSTRACT

Disclosed are a mobile terminal capable of starting data sharing through an infrared signal and a control method therefor. To this end, the mobile terminal may comprise: a wireless communication unit for performing wireless communications; and infrared transceiver for transmitting and receiving an infrared signal; a user input unit for receiving a user input; and a control unit for controlling a first infrared signal to be output through the infrared transceiver when a first user input is received through the user input unit, and controlling shared data to be transmitted to an external terminal through the wireless communication unit when a second infrared signal is received from the external terminal which has received the first infrared signal.

17 Claims, 17 Drawing Sheets

(58) Field of Classification Search
USPC .......................................................... 398/128
See application file for complete search history.

(56)     References Cited

U.S. PATENT DOCUMENTS

| 2004/0104864 | A1* | 6/2004 | Nakada | ................ | G02B 27/017 |
| | | | | | 345/8 |
| 2009/0055480 | A1 | 2/2009 | Choi et al. | | |
| 2009/0163195 | A1* | 6/2009 | Kim | ...................... | H04W 48/18 |
| | | | | | 455/422.1 |
| 2014/0113550 | A1* | 4/2014 | Li | ........................... | H04L 67/06 |
| | | | | | 455/41.1 |
| 2014/0152696 | A1* | 6/2014 | Jung | ....................... | G06F 3/011 |
| | | | | | 345/633 |

FOREIGN PATENT DOCUMENTS

| KR | 10-2009-0068567 A | 6/2009 |
| KR | 10-2014-0051070 A | 4/2014 |

* cited by examiner

MOBILE TERMINAL AND CONTROL METHOD THEREFOR

CROSS REFERENCE TO RELATED APPLICATIONS

This application is the National Phase of PCT International Application No. PCT/KR2015/005716, filed on Jun. 8, 2015, which claims priority under 35 U.S.C. 119(a) to patent application Ser. No. 10-2014-0106138, filed in Republic of Korea on Aug. 14, 2014, all of which are hereby expressly incorporated by reference into the present application.

TECHNICAL FIELD

The present invention relates to a mobile terminal and controlling method thereof, suitable for initiating a data sharing through an infrared signal.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Recently, functions of a mobile terminal tend to be diversified. For instance, the diversified functions include a function of data and audio communication, a function of photographing and video-making through a camera, a function of audio recording, a function of music file play through a speaker system, a function of outputting an image or video to a display unit, and the like. A prescribed terminal is further equipped with an electronic game play function or performs a multimedia player function. Particularly, a recent mobile terminal is able to receive multicast signals for providing visual contents such as a broadcast, a video, a television program and the like.

Since a recently popular wearable device of a watch or glass type is worn on a part of a user's body, its portability is advantageously convenient. Since a wearable device is always exposed out of a body, a user can be easily aware whether a counterpart currently wears the wearable device.

Having confirmed that a counterpart currently wears a wearable device, a user may make a request for a data sharing between wearable devices. For instance, in order to enable a data sharing between wearable devices, a user can perform manipulations such as activation of a Bluetooth module of a user's wearable device, selection of a counterpart wearable device to be paired with the user's wearable device, selection of data to be shared with the counterpart wearable device, and the like.

However, it may take a considerable time until Bluetooth is turned on (e.g., a time taken to call a menu for activating Bluetooth). And, it may also take a considerable time to select data for a sharing (e.g., a time taken to select a photo to be sent to a counterpart from a photo list). Thus, it may considerably cause inconvenience to a user desiring to attempt a data sharing.

The present invention intends to disclose a method of sharing data between wearable devices with simple manipulation only.

DISCLOSURE OF THE INVENTION

Technical Task

One technical task of the present invention is to provide a mobile terminal and controlling method thereof, by which user convenience is enhanced.

Particularly, a technical task of the present invention is to provide a mobile terminal, by which a data sharing can be initiated through transceiving infrared signals.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a mobile terminal, including a wireless communication unit configured to perform wireless communication, an IR (infrared) transceiver configured to transceive IR signals, a user input unit configured to receive a user input, and a controller configured to if receiving a first user input through the user input unit, control a first IR signal to be outputted through the IR transceiver, the controller further configured to if receiving a second IR signal from an external terminal having received the first IR signal, control shared data to be sent to the external terminal through the wireless communication unit.

In another technical aspect of the present invention, provided herein is a method of controlling a mobile terminal, including if a first user input is received, outputting a first IR (infrared) signal from an IR transceiver, receiving a second IR signal through the IR transceiver from an external terminal having received the first IR signal, and if the second IR signal is received, sending shared data to the external terminal.

Technical solutions obtainable from the present invention are non-limited by the above mentioned solutions. And, other unmentioned solutions can be clearly understood from the following description by those having ordinary skill in the technical field to which the present invention pertains.

Advantageous Effects

Effects of a mobile terminal and controlling method thereof according to the present invention are described as follows.

According to at least one of embodiments of the present invention, a mobile terminal capable of enhancing user convenience can be provided.

Particularly, the present invention advantageously provides a mobile terminal capable of initiating a data sharing through transceiving infrared signals.

Technical tasks obtainable from the present invention are non-limited by the above mentioned technical tasks. And, other unmentioned technical tasks can be clearly understood from the following description by those having ordinary skill in the technical field to which the present invention pertains.

BEST MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
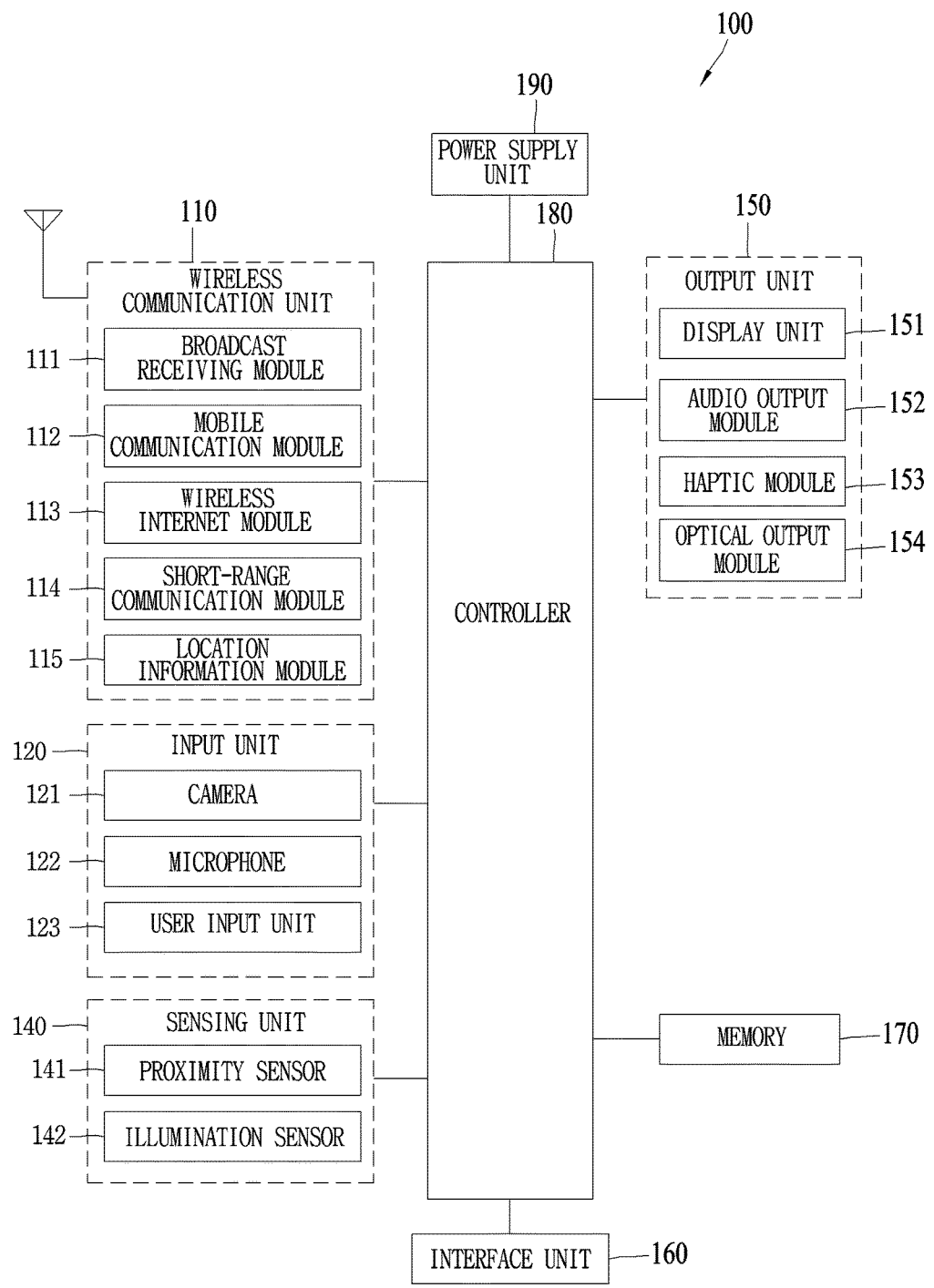
FIG. 1A is a block diagram to describe a mobile terminal related to the present invention.
Figure 1B:
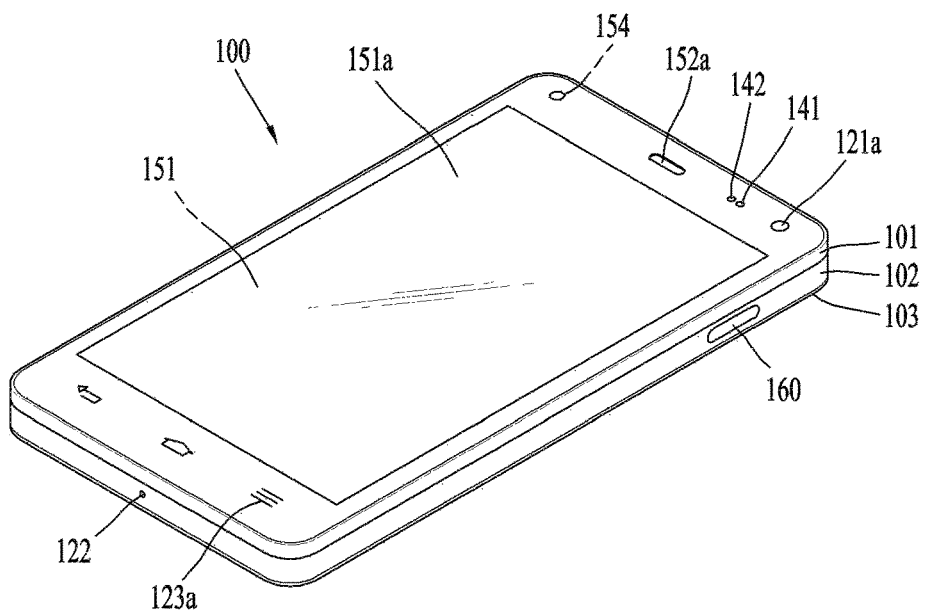
FIG. 1B and FIG. 1C are conceptual diagrams for one example of a mobile terminal related to the present invention in different views.
Figure 1C:
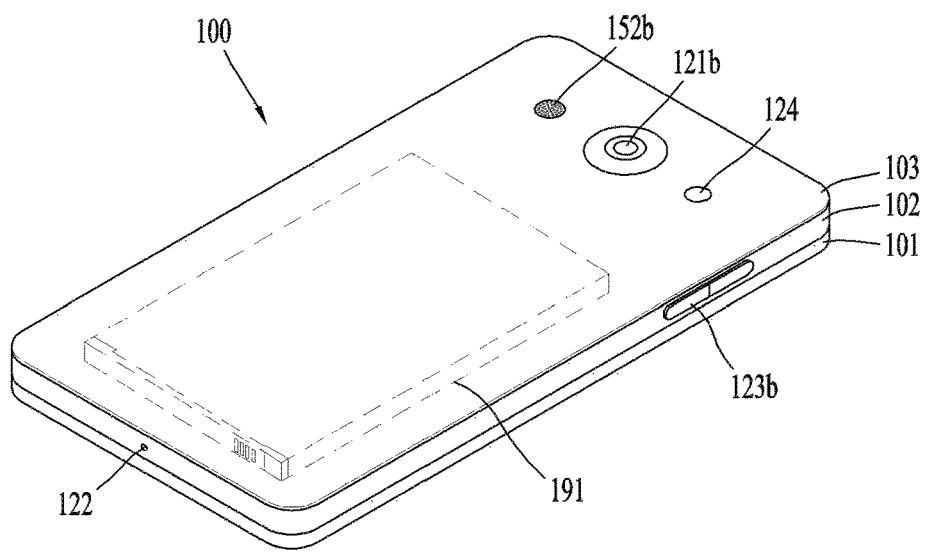

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the respective components may operate in cooperation with one another to implement a method of operation, control, or control method of the mobile terminal according to various embodiments described below. In addition, the operation, control, or control method of the mobile terminal may be implemented on the mobile terminal by driving at least one application program stored in the memory 170.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body can be understood as a concept of referring to the mobile terminal 100 as at least one aggregate.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 is provided with a display unit 151, first and second sound output units 152a and 152b, a proximity sensor 141, an illuminance sensor 142, a light output unit 154, Cameras 121a and 121b, first and second operation units 123a and 123b, a microphone 122, an interface unit 160, and the like.

Like described in FIGS. 1B and 1C, a display unit 151, a first sound output unit 152a, a proximity sensor 141, an illuminance sensor 142, an optical output unit 154, a first camera 121a and a first operation unit 123a are arranged on the side of the terminal body and a second operation unit 123b, a microphone 122 and an interface unit 160 are disposed on a side surface of the terminal body, A mobile terminal 100 in which a second sound output unit 152b and a second camera 121b are disposed on the rear side of the mobile terminal 100 will be described as an example.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 displays (outputs) information processed by the mobile terminal 100. For example, the display unit 151 may display execution screen information of an application program driven by the mobile terminal 100, or UI (User Interface) and GUI (Graphic User Interface) information according to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

In addition, the display unit 151 may exist in two or more depending on the embodiment of the mobile terminal 100. In this case, the mobile terminal 100 may be provided with a plurality of display portions spaced apart from one another or may be disposed integrally with each other, or disposed on different surfaces.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces. The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
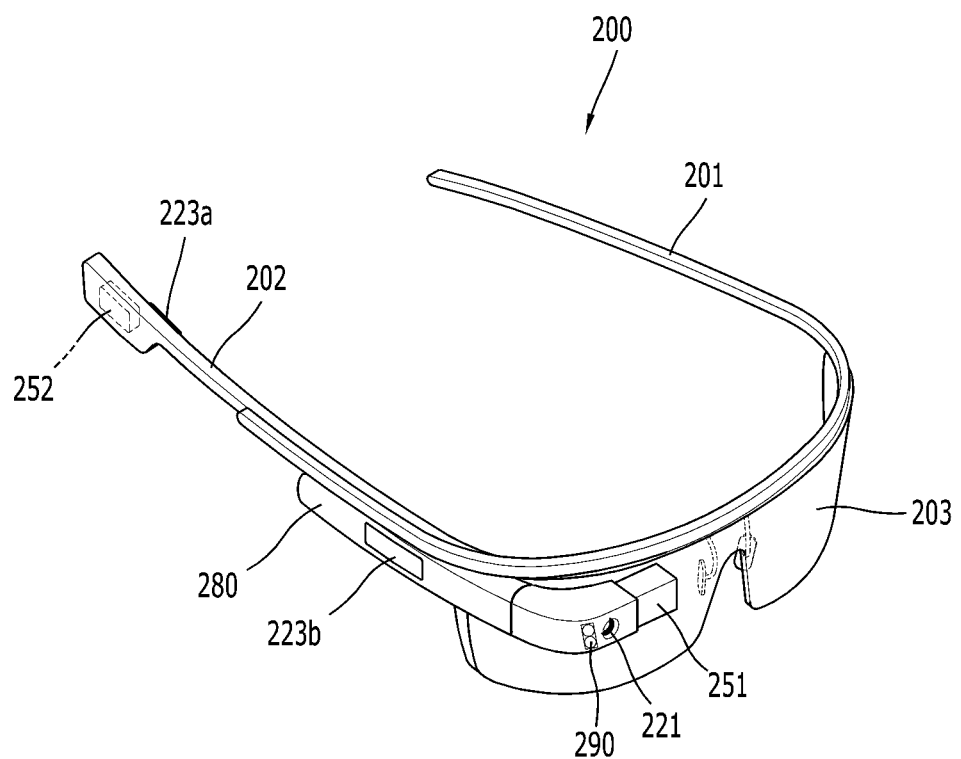
FIG. 2 is a perspective diagram for one example of a mobile terminal of a glass type related to another embodiment of the present invention.

FIG. 2 is a perspective diagram for one example of a mobile terminal 200 of a glass type related to another embodiment of the present invention.

The glass-type mobile terminal 200 is configured wearable on a head of a human body and provided with a frame part (e.g., case, housing, etc.) therefor. The frame part may be made of a flexible material to be easily worn. In the drawing, the frame part is shown having a first frame 201 and a second frame 202, which can be made of the same or different materials. In general, the mobile terminal 200 may be configured to include features that are the same or similar to those of the mobile terminal 100 of FIGS. 1A to 1C.

The frame may be supported on the head and defines a space for mounting various components. As illustrated, electronic components, such as a control module 280, an audio output module 252, and the like, may be mounted to the frame part. Also, a lens 203 for covering at least one of the left and right eyes may be detachably coupled to the frame part.

The control module 280 controls various electronic components disposed in the mobile terminal 200. The control module 280 may be understood as a component corresponding to the aforementioned controller 180. In the present drawing, the control module 280 is installed in the frame part on one side of the head, but other locations are possible.

The display unit 251 may be implemented as a head mounted display (HMD). The HMD refers to display techniques by which a display is mounted to a head to show an image directly in front of user's eyes. In order to provide an image directly in front of the user's eyes when the user wears the glass-type mobile terminal 200, the display unit 251 may be located to correspond to at least one of the left and right eyes. In the present drawing, the display unit 251 is illustrated as located on a portion corresponding to the right eye to output an image viewable by the user's right eye.

The display unit 251 may project an image into the user's eye using a prism. Also, the prism may be formed of optically transparent material such that the user can view both the projected image and a general visual field (a range that the user views through the eyes) in front of the user.

In such a manner, the image output through the display unit 251 may be viewed while overlapping with the general visual field. The mobile terminal 200 may provide an augmented reality (AR) by overlaying a virtual image on a real image or background using the features of the display.

The camera 221 may be located adjacent to at least one of the left and right eyes to capture an image. Since the camera 221 is located adjacent to the eye, the camera 221 can acquire a scene that the user is currently viewing.

In the present drawing, the camera 221 is illustrated as provided to the control module 280, and may be positioned at any location of the mobile terminal. The camera 221 may be installed in the frame part. Multiple cameras may be utilized to acquire a stereoscopic image.

The glass-type mobile terminal 200 may include user input units 223a and 223b, which can each be manipulated by the user to provide an input of a control command. The user input units 223a and 223b may employ techniques which permit input via a tactile input. Typical tactile inputs include a touch, push, or the like. The user input units 223a and 223b are shown operable in a pushing manner and a touching manner as they are located on the frame part and the control module 280, respectively.

If desired, the mobile terminal 200 may include a microphone (not shown) which processes input sound into electric audio data, and an audio output module 252 for outputting audio. The audio output module 252 may be configured to produce audio in a general audio output manner or an osteoconductive manner. When the audio output module 252 is implemented in the osteoconductive manner, the audio output module 252 may closely adhere to the head, when the user wears the mobile terminal 200, and vibrate the user's skull to transfer sounds.

In addition, the glass-type mobile terminal 200 may include an IR (infrared) transceiver 290 capable of transceiving IR signals. The IR transceiver 290 may be located to view the same direction of user's eyes by being placed adjacent to the left or right eye. The IR transceiver 290 may be configured as a set of an IR transmitter transmitting an IR signal and an IR receiver receiving an IR signal.

In the preset drawing, the IR transceiver 290 is illustrated as provided to the control module 280, by which the present example is non-limited. The IR transceiver 290 may be installed in the frame part, and multiple IR transceivers 290 may be utilized.

The glass-type mobile terminal 200 can recognize a person or object in front by analyzing an image (or video) generated by the camera 221 that captures a front view. Yet, in case of recognizing the person or object in front using the camera 221, since an operation amount of the control module 280 according to the image analysis is considerably large, the power consumption of the mobile terminal 200 increases.

Thus, if the IR transceiver 290 is used instead of the camera 221, a person or object in front can be recognized while the power consumption of the mobile terminal 200 is decreased.

For clarity of the description, a mobile terminal according to the present invention is assumed as a glass type like the example shown in FIG. 2. And, the mobile terminal according to the present invention is assumed as including at least one of the components shown in FIG. 1 or FIG. 2. Particularly, the mobile terminal according to the present invention is typically assumed as including the wireless communication unit 110, the user input unit 123/223, the sensing unit 140, the display unit 151/251, the controller 180/280, and the IR transceiver 290. Like the example shown in FIG. 2, the user input unit 232 is assumed as employing the push or touch input manner on the frame part and the control module 280.

The present invention discloses a method of sharing data between two mobile terminals. For clarity of the description, the two mobile terminals participating in the data sharing shall be named 'first terminal' and 'second terminal', respectively. A method of sharing data between two mobile terminals shall be described in detail as follows.

Figure 3:
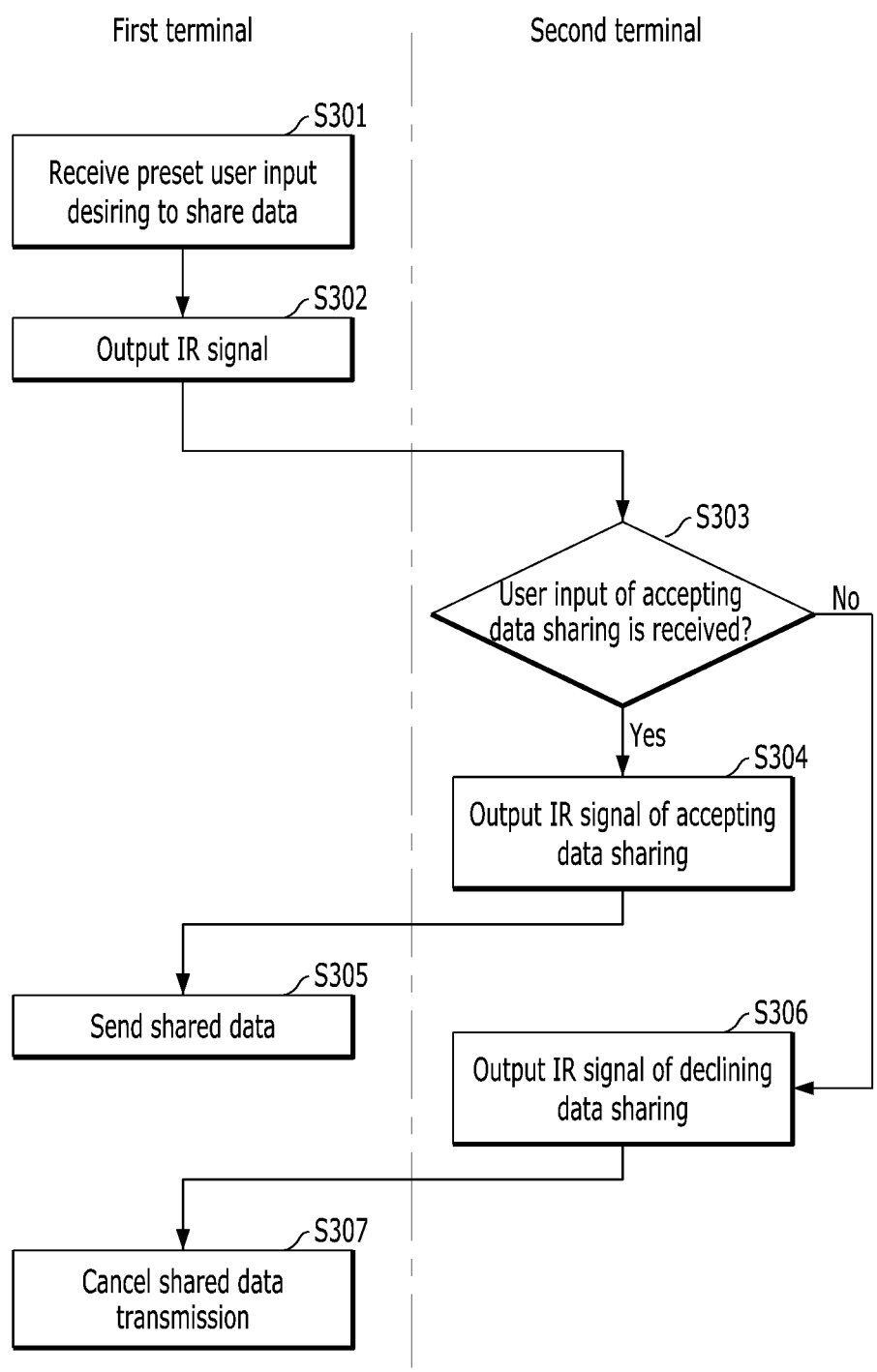
FIG. 3 is a flowchart to describe a method of sharing data between two terminals.

FIG. 3 is a flowchart to describe a method of sharing data between two terminals. If a first terminal determines data to share with a second terminal (hereinafter, such data shall be named 'shared data') and receives an input of a preset user input to share the data [S301], a controller may control an IR signal to be outputted through an IR transceiver [S302]. In doing so, the IR signal outputted by the first terminal may contain communication information of the first terminal. Namely, the communication information of the first terminal may include information the first terminal should provide to the second terminal for the wireless communication with the second terminal.

For instance, when the first and second terminals communicate with each other using Bluetooth communication technology, the communication information of the first terminal may include at least one of an identification information (e.g., name) of the first terminal for identifying the first terminal and a password set for a paring.

When the first and second terminals communicate with each other using WiFi communication technology, the communication information of the first terminal may include at least one of an identification information (e.g., SSID) of the first terminal for identifying the first terminal and a password set for association with the first terminal.

When the first and second terminals communicate with each other using a mobile communication technology (e.g., LTE, HSPDA, HSPA, etc.), the communication information of the first terminal may include at least one of an identification information (e.g., name) of the first terminal for identifying the first terminal and an address (e.g., MAC address, IP address, etc.) of the first terminal.

The IR signal outputted by the first terminal may further contain location information of the first terminal. The first terminal may output the IR signal in a manner that location information obtained by a location information module is contained in the IR signal.

Since the IR signal has the feature of straight, if the second terminal confronts the first terminal, the second terminal may receive the IR signal outputted from the first terminal. As the second terminal confronts the first terminal, if the IR signal outputted by the first terminal is received, the second terminal may display a message indicating that a data sharing is requested by the first terminal.

In doing so, if the second terminal determines a case that a location of the first terminal is adjacent to a current location of the second terminal, the second terminal may control a message, which indicates that a data sharing is requested, to be outputted. This is to prevent information (i.e., message), which is not desired by a user, from being displayed on the second terminal as the second terminal accidently confronts the first terminal. For detailed example, if the second terminal accidently confronts the first terminal, the second terminal may receive an IR signal outputted by the first terminal. In doing so, if the first terminal outputting the IR signal is spaced apart from the second terminal in a long distance, the second terminal may ignore the received IR signal and omit an output of a message.

Based on whether the first terminal is located within a prescribed distance from a current location of the second terminal, the second terminal can determine whether the first terminal is adjacent to the second terminal. Herein, a distance between the second terminal and the first terminal may be calculated based on latitude and longitude values of the first and second terminals, by which the present example is non-limited.

While the message is outputted, a user of the second terminal may apply a user input of accepting or declining the data sharing. If the user input of accepting the data sharing is received [S303], the second terminal may output an IR signal containing information indicating that the data sharing is accepted through an IR transmitter [S304]. Herein, communication information of the second terminal may be contained in the IR signal outputted by the second terminal. And, the communication information of the second terminal may contain information the second terminal should provide to the first terminal through the wireless communication with the first terminal.

For instance, when the first and second terminals communicate with each other using Bluetooth communication technology, the communication information of the second terminal may include at least one of an identification information (e.g., name) of the second terminal for identifying the second terminal and a password set for a paring.

When the first and second terminals communicate with each other using WiFi communication technology, the communication information of the second terminal may include at least one of an identification information (e.g., SSID) of the second terminal for identifying the second terminal and a password set for association with the second terminal.

When the first and second terminals communicate with each other using a mobile communication technology (e.g., LTE, HSPDA, HSPA, etc.), the communication information of the second terminal may include at least one of an identification information (e.g., name) of the second terminal for identifying the second terminal and an address (e.g., MAC address, IP address, etc.) of the second terminal.

The IR signal outputted by the second terminal may further contain location information of the second terminal. The second terminal may output the IR signal in a manner that location information obtained by a location information module is contained in the IR signal.

If receiving the IR signal containing the information for accepting the data sharing from the second terminal, the first terminal may send data (hereinafter called 'shared data') desired to share with the second terminal to the second terminal [S305].

Herein, the shared data may include a content currently outputted from the first terminal (e.g., a photo or video currently displayed on the first terminal, a music currently played in the first terminal, etc.) or a data selected by a user from a content list. Herein, the content may include a photo, a document, a video, a music, or the like.

In this case, the shred data may be sent on a wireless communication channel (e.g., Bluetooth communication channel, Wi-Fi communication channel, etc.) between the first terminal and the second terminal, or may be sent to a base station by targeting a communication address of the second terminal as a destination.

To this end, before the shared data is sent, it is necessary for a wireless communication channel to be established between the first terminal and the second terminal or mutual communication addresses may be shared between the first terminal and the second terminal. Before the first terminal outputs the IR signal through the IR transmitter, if the wireless communication between the first and second terminals is already established or the first terminal is aware of the communication address of the second terminal, the first terminal can select a target to which the shared data will be sent based on the second terminal's identification information received through the IR signal.

For instance, while the firster terminal is establishing Bluetooth communication channels with terminals A, B and C, if the first terminal receives an IR signal from the terminal B, the first terminal can select the terminal B as a target to which the shared data will be sent.

Before the first terminal outputs an IR signal through the IR transmitter, if a wireless communication between the first terminal and the second terminal is not established yet or the first terminal is not aware of a communication address of the second terminal, at least one of the first terminal and the second terminal may establish a wireless communication channel or recognize the communication address, using counterpart's communication information received through the IR signal.

For instance, if an IR signal containing communication information of the first terminal is received, the second terminal may make a request for a Bluetooth pairing to the first terminal using the received communication information. Once a Bluetooth communication channel is established between the first terminal and the second terminal, the first terminal can send shared data to the second terminal through the established Bluetooth communication channel.

In doing so, only if the first terminal determines that the location of the second terminal is adjacent to a current location of the first terminal, the first terminal may send the shared data to the second terminal. For instance, if the first terminal accidently confronts the second terminal, the second terminal may receive an IR signal outputted by the first terminal and the first terminal may receive an IR signal outputted by the second terminal as well. In doing so, if the second terminal is spaced apart from the first terminal in a long distance, the first terminal may ignore the IR signal received from the second terminal and omit the transmission of the shared data. Herein, the distance between the first terminal and the second terminal may be calculated based on latitude and longitude values of the first terminal and the second terminal or a time taken to receive the IR signal outputted from the second terminal after outputting its IR signal.

If the user input of declining the reception of the shared data is received [S303], the second terminal may output an IR signal containing information, which indicates that the second terminal will not receive the shared data, to the first terminal [S306]. In case that the second terminal declines the reception of the shared data, the first terminal may cancel to send the shared data to the second terminal [S307].

After the first terminal has outputted an IR signal, if the first terminal fails to receive an IR signal within a prescribed time, the first terminal may cancel to send the shared data to the second terminal.

While transmitting the shared data, the first terminal may output an IR signal periodically. If the IR signal outputted by the first terminal is received, the second terminal can output an IR signal in response to the received signal. By receiving the IR signal outputted from the second terminal, the first terminal can recognize that the second terminal confronts the first terminal.

As a user of the first or second terminal turns user's head, if the first terminal and the second terminal fail to confront each other no more, the first terminal may stop the transmission of the shared data. For instance, a user of the second terminal currently worn by the user may look at the first terminal for a while and then turn user's head. In doing so, the first terminal keeps sending the shared data while the second terminal confronts the first terminal. If the second terminal fails to look at the first terminal no more, the first terminal may stop sending the shared data.

Namely, if failing to receive a response signal in response to an output of an IR signal from the second terminal, the first terminal can stop sending the shared data. In case that the first terminal and the second terminal fail to confront each other temporarily due to an instantaneous movement of the first terminal or the second terminal, in order to prevent the data sharing from being stopped, the first terminal may control the transmission of the shared data to be stopped only if failing to receive the response to the IR signal N times consecutively, where N is a natural number.

Figure 4:
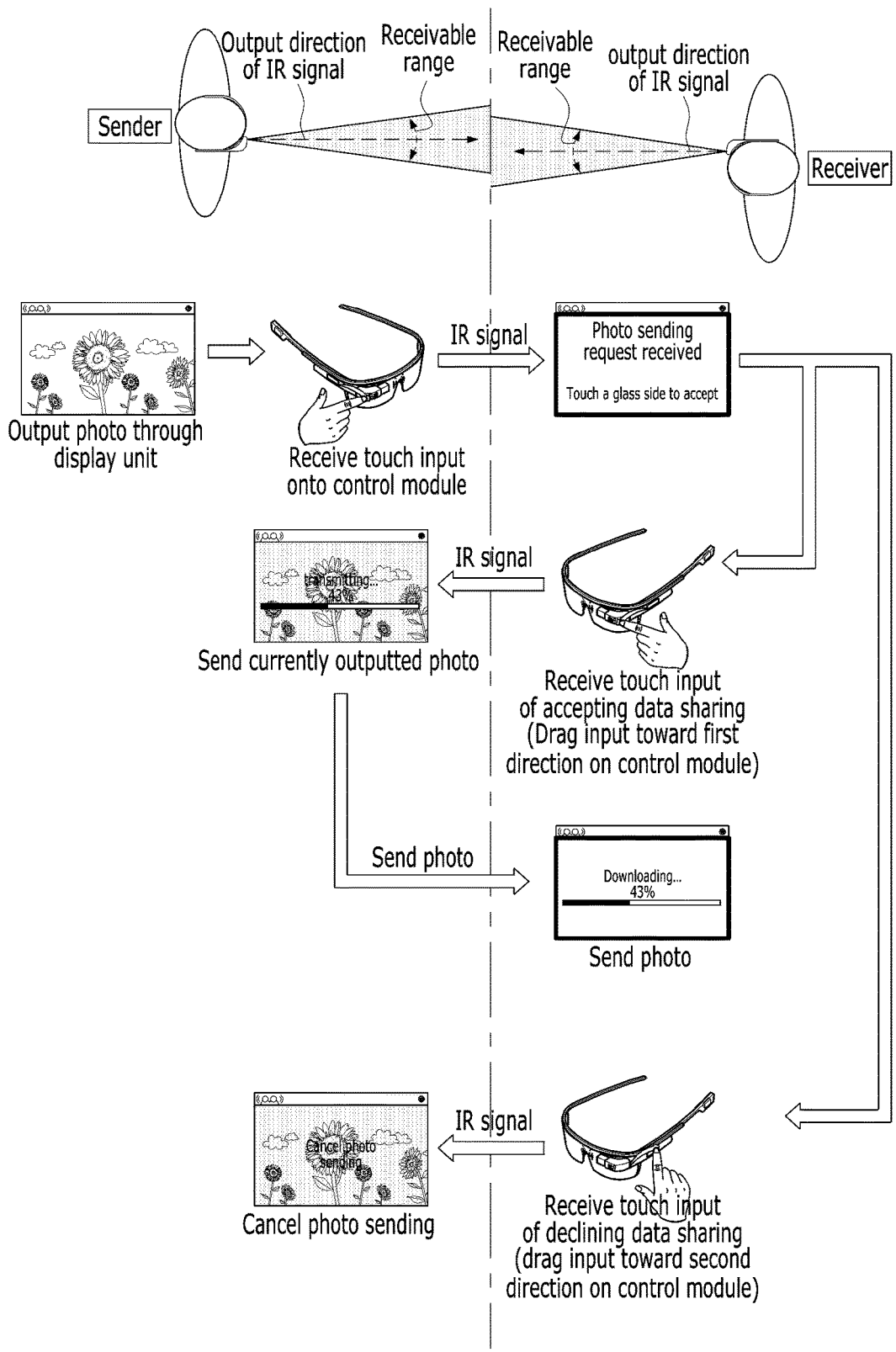
FIG. 4 is a diagram for one example of performing a data sharing between first and second terminals.

FIG. 4 is a diagram for one example that a data sharing is performed between first and second terminals. For clarity of the description, in FIG. 4, assume that shared data is a photo.

While a photo is outputted through a display unit of a first terminal, if a preset user input for desiring to share data is received, the first terminal may control an IR signal to be outputted. Herein, like the example shown in FIG. 4, the preset user input may include an input of dragging a pointer on a control module in a prescribed direction, by which the present example is non-limited. The preset user input may include tapping the control module prescribed times, touching the control module over a prescribed time, or the like.

Since an IR signal has the feature of straight, the IR signal outputted from the first terminal may be received by a mobile terminal disposed to confront the first terminal. Namely, a user of the first terminal may determine a target, which will receive the IR signal, in a manner of confronting a counterpart's terminal to which shared data will be sent.

If receiving the IR signal from the first terminal, the second terminal may control information, which indicates whether to accept a data sharing, to be outputted. While the information is outputted, if a user input of accepting the data sharing is received from a user of the second terminal, the second terminal can output an IR signal for requesting a data transmission. If the first terminal confronts the second terminal, the first terminal may receive the IR signal outputted by the second terminal.

If receiving the IR signal from the second terminal, the first terminal may specify a target to which shared data will be sent. If receiving the IR signal outputted from the second terminal, the first terminal can send the displayed photo to the second terminal. In doing so, the first terminal may control a transmission status of the shared data to be outputted. FIG. 4 shows an example that a progress bar representing a transmission complete rate of the shared data is outputted.

If a user input of declining a data sharing is received from a user of the second terminal, the second terminal may output an IR signal indicating that the second terminal will not receive the shared data.

If the IR signal of declining the data sharing is received, as shown in FIG. 4, the first terminal may control information, which indicates that the data sharing with the second terminal is cancelled, to be outputted.

Herein, the preset user input for accepting the data sharing, as shown in FIG. 4, includes an input of dragging to move a pointer on a control module in a first direction and the preset user input for declining the data sharing, as shown in FIG. 4, includes an input of dragging to move a pointer on a control module in a second direction opposite to the first direction, by which the present example is non-limited. The preset user input may include tapping the control module prescribed times, touching the control module over a prescribed time, or the like.

While transmitting the shared data, the first terminal may output an IR signal periodically and then receive an IR signal outputted by the second terminal in response to the outputted signal. Through this, the first terminal can check whether that the second terminal confronts the first terminal. While the shared data is sent, as a user of the second terminal turns user's head, if the first terminal and the second terminal fail to confront each other no more, the first terminal may control the transmission of the shared data to be stopped.

Figure 5:
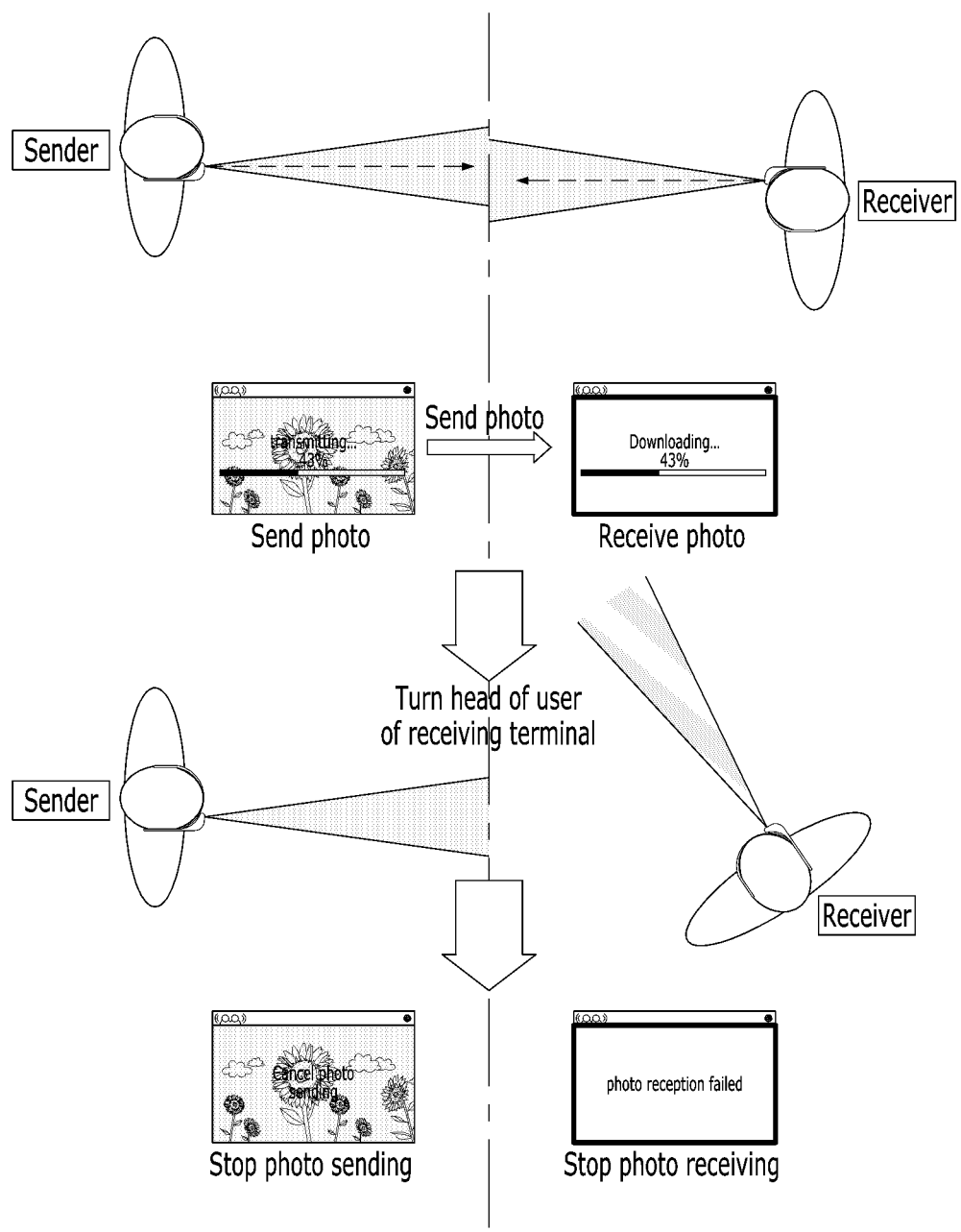
FIG. 5 is a diagram to describe an example that a transmission of shared data is stopped.

For instance, FIG. 5 is a diagram to describe an example that a transmission of shared data is stopped.

While transmitting shared data, the first terminal may output an IR signal periodically. If the IR signal outputted by the first terminal is received, the second terminal can output an IR signal in response to the received signal.

If receiving the IR signal outputted from the second terminal, the first terminal can continue to send the shared data to the second terminal.

Yet, as shown in FIG. 5, if a user of the second terminal turns user's head, the second terminal is unable to receive the IR signal outputted from the first terminal no more. Hence, the first terminal may not be able to receive the IR signal outputted from the second terminal.

As above, if the first terminal and the second terminal do not confront each other anymore, the transmission of the shared data of the first terminal can be stopped.

As the user of the second terminal turns user's head, if the first terminal and the second terminal do not confront each other anymore, it is a matter of course that the transmission of the shared data can be stopped as well.

Yet, despite that one of the users of the first and second terminals desires to continue the data sharing, in order to prepare for a case that it is difficult to keep looking at the other user, when a preset user input is received through one of the first terminal and the second terminal, the first terminal may control the transmission of the shared data not to be stopped even if the first terminal and the second terminal fail to confront each other anymore.

Figure 6:
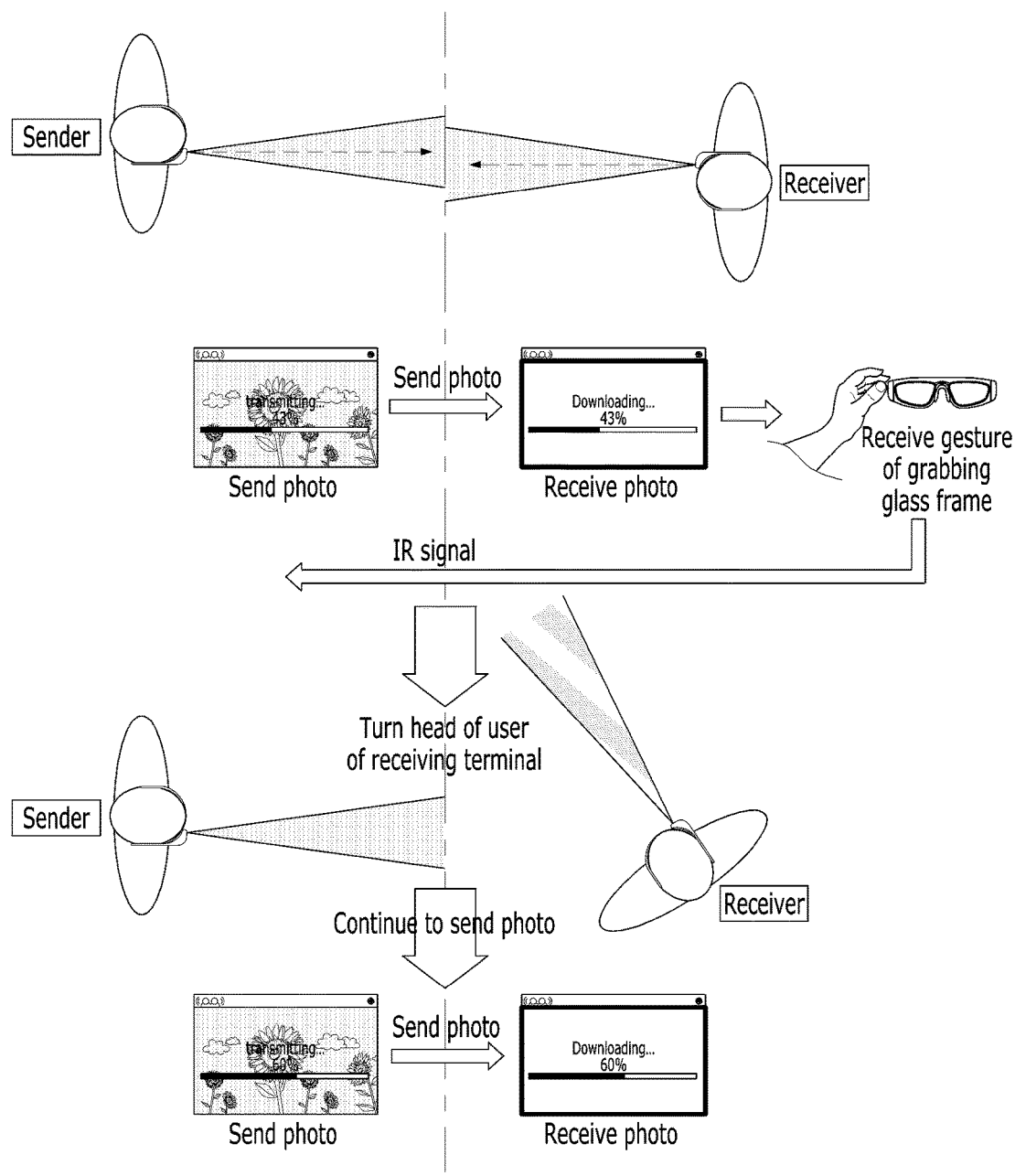
FIG. 6 is a diagram for one example of sending shared data continuously despite that first and second terminals fail to confront each other.

For instance, FIG. 6 is a diagram for example of sending shared data continuously despite that first and second terminals fail to confront each other.

While transmitting shared data, the first terminal may output an IR signal periodically. If the IR signal outputted by the first terminal is received, the second terminal can output an IR signal in response to the received signal.

In doing so, if a preset gesture input is inputted through one of the first terminal and the second terminal, the terminal having the preset gesture inputted thereto may output an IR signal, which indicates that it is unable to look at the counterpart terminal anymore, to the counterpart terminal. For instance, in FIG. 6, a gesture input for a user of the second terminal to grab a glass frame is received, and the second terminal outputs an IR signal in response to the gesture input.

If so, although the first terminal determines that the second terminal does not look at the first terminal, the first terminal may not stop the transmission of the shared data.

The first terminal periodically outputs an IR signal, and the second terminal may output an IR signal in response to the former IR signal periodically outputted by the first terminal. In doing so, if location information of the second terminal is contained in the IR signal outputted by the second terminal, the first terminal may be able to calculate a distance between the first terminal and the second terminal. Or, the first terminal may be able to measure a distance between the first terminal and the second terminal based on a time taken for the first terminal to receive an IR signal outputted from the second terminal after outputting an IR signal.

In this case, if the distance between the first terminal and the second terminal exceeds a preset distance, the first terminal may stop the shared data transmission to the second terminal. This is described in detail with reference to FIG. 7.

Figure 7:
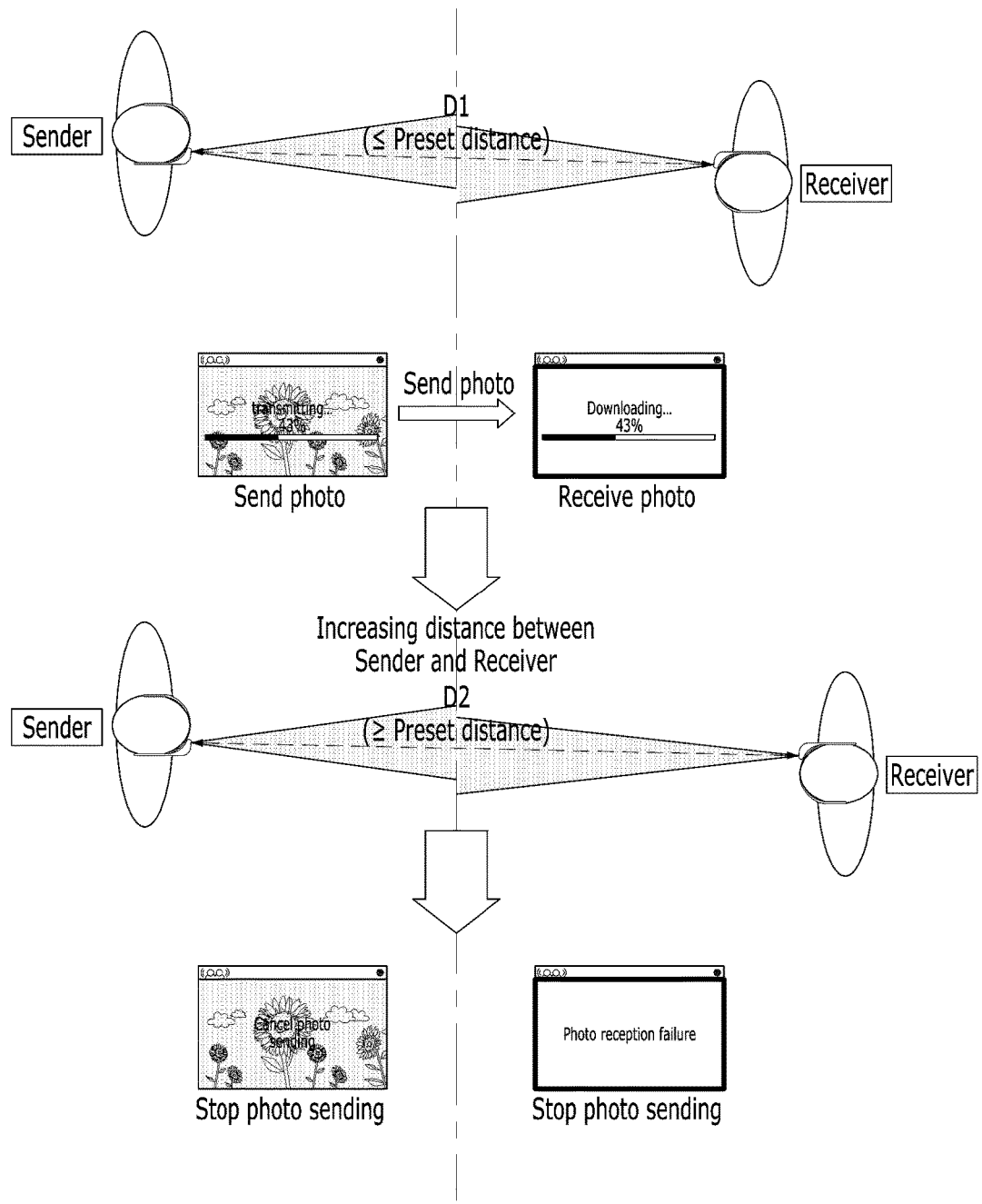
FIG. 7 is a diagram to describe an example that a data sharing is stopped.

FIG. 7 is a diagram to describe an example that a data sharing is stopped.

If a distance between a first terminal and a second terminal is equal to or smaller than a preset distance, the first terminal can send shared data to the second terminal.

Thereafter, as the first or second terminal is moved, if the distance between the first terminal and the second terminal exceeds the preset distance, the first terminal may stop sending the shared data to the second terminal.

In order for the second terminal to receive an IR signal outputted from the first terminal, it is necessary for the first terminal and the second terminal to confront each other. Hence, before outputting the IR signal, the first terminal or the second terminal displays guide information for guiding a region, from which an output of the IR signal is estimated, on an image inputted through a camera, thereby guiding a location a user should look at. Thereafter, if the first or second terminal recognizes a counterpart's face in the region from which an IR is estimated to be outputted, it is able to output an IR signal at last.

Figure 8:
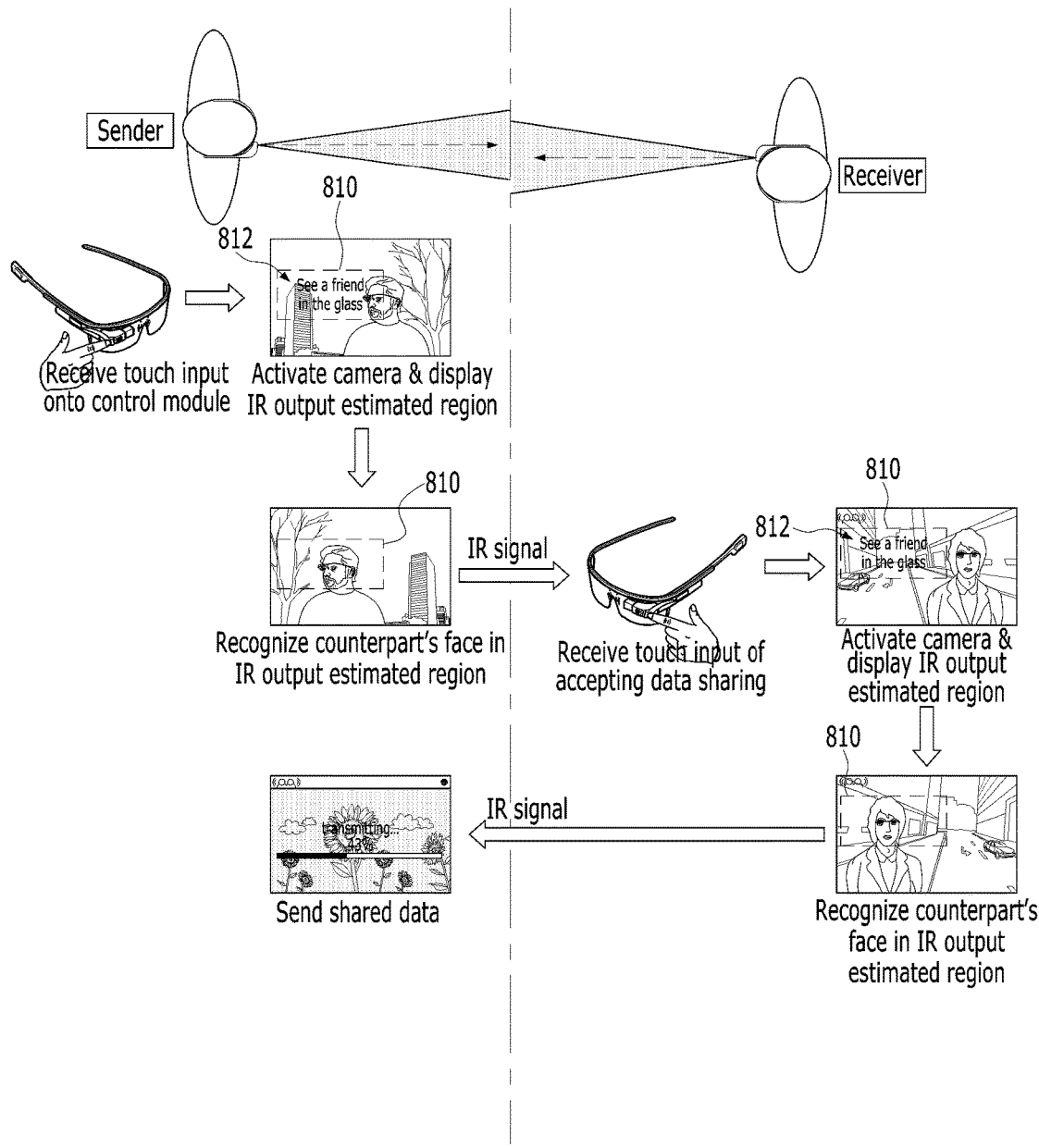
FIG. 8 is a diagram for an example of guiding a region estimated for an output of an infrared signal.

For instance, FIG. 8 is a diagram for an example of guiding a region estimated from which an output of an infrared signal is estimated. If a preset user input (e.g., a user input of requesting a data sharing (received by a first terminal) or a user input of accepting a data sharing (received by the second terminal) is received, the first terminal or the second terminal activates a camera before outputting an IR signal and is then able to display an image inputted through the camera. In doing so, the first terminal or the second terminal may control guide information, which guides a region estimated to output an IR signal, to be outputted. In FIG. 8, a region estimated to output an IR signal is enclosed by an outline 810 for example.

If a counterpart's face is not recognized in the region estimated to output an IR signal, like the example shown in FIG. 8, the first terminal or the second terminal may control a message 812, which requests to confront a counterpart, to be outputted.

Thereafter, if the counterpart's face is recognized in the region estimated to output an IR signal according to a movement of a mobile terminal, the first terminal or the second terminal may output the IR signal at last.

The first terminal may determine a communication means for sending shared data according to a type of a preset user input. Particularly, if a user input of a first type is received, the first terminal sends shared data to the second terminal through a first wireless communication technology. If a user input of a second type is received, the first terminal sends shared data to the second terminal through a second wireless communication technology.

Figure 9:
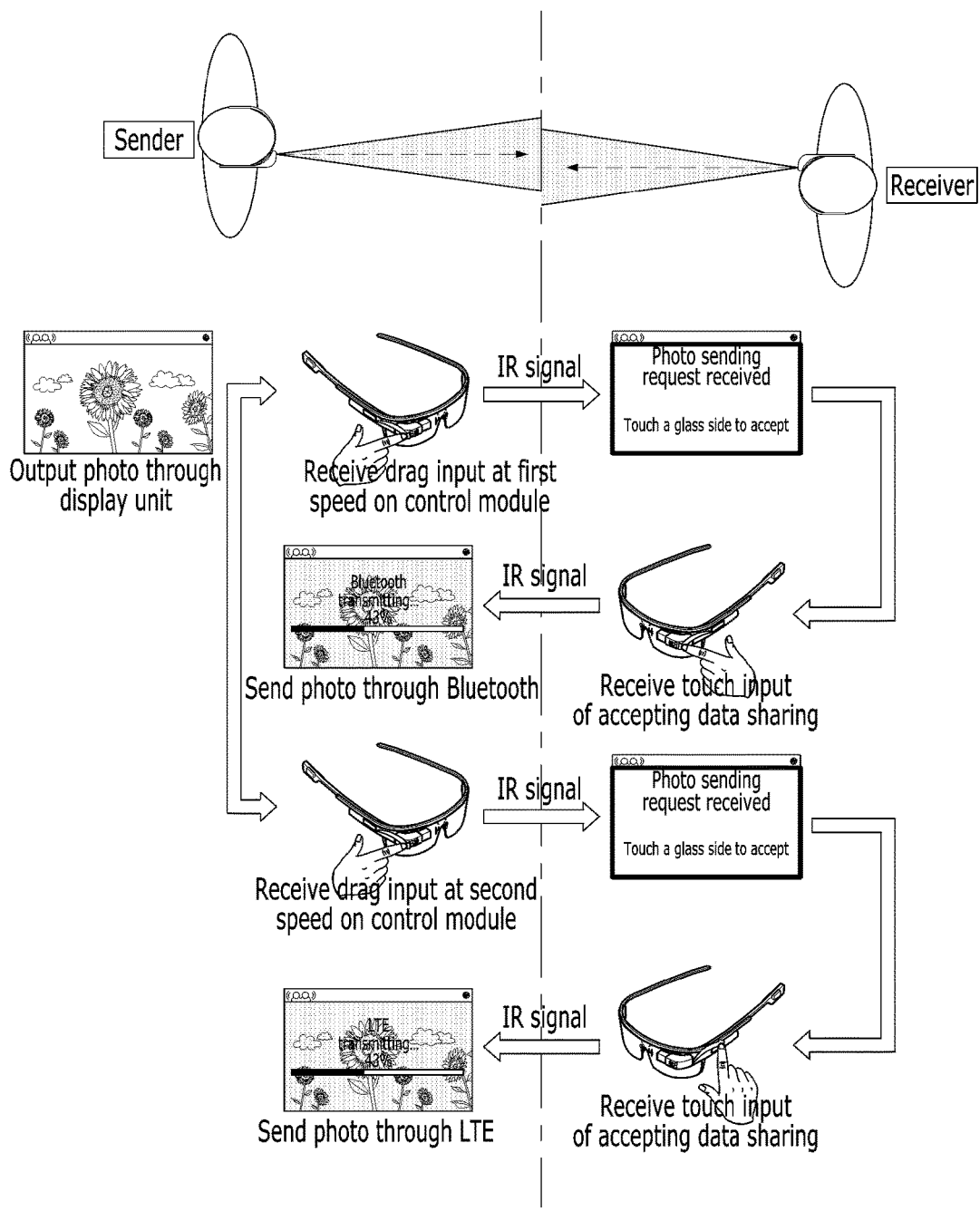
FIG. 9 is a diagram for an example that a communication means for sending shared data is determined according to a preset user input type.

FIG. 9 is a diagram for an example that a communication means for sending shared data is determined according to a preset user input type.

Like the example shown in FIG. 9, if a moving speed of a pointer for applying a drag input onto a control module is lower than a preset speed, a controller may send shared data to a second terminal through Bluetooth communication technology.

Like the example shown in FIG. 9, if a moving speed of a pointer for applying a drag input onto a control module is equal to or higher than the preset speed, a first terminal may send shared data to the second terminal through a mobile communication technology (e.g., LTE, HSPDA, etc.).

Unlike the illustrated example, it is a matter of course that a communication means for sending shared data can be determined based on a count of received drag inputs, a count of tapping a control module, a time for maintaining a touch to a control module, etc.

In FIG. 4, a content (e.g., photo) currently outputted through the first terminal is determined as data to be shared with the second terminal for example. For another instance, if a user input for setting a mode of the first terminal to a share mode is received, the first terminal may output a content list for selecting a content to be shared with the second terminal. If a selection of at least one from the content list is completed, the first terminal may output an IR signal.

Figure 10:
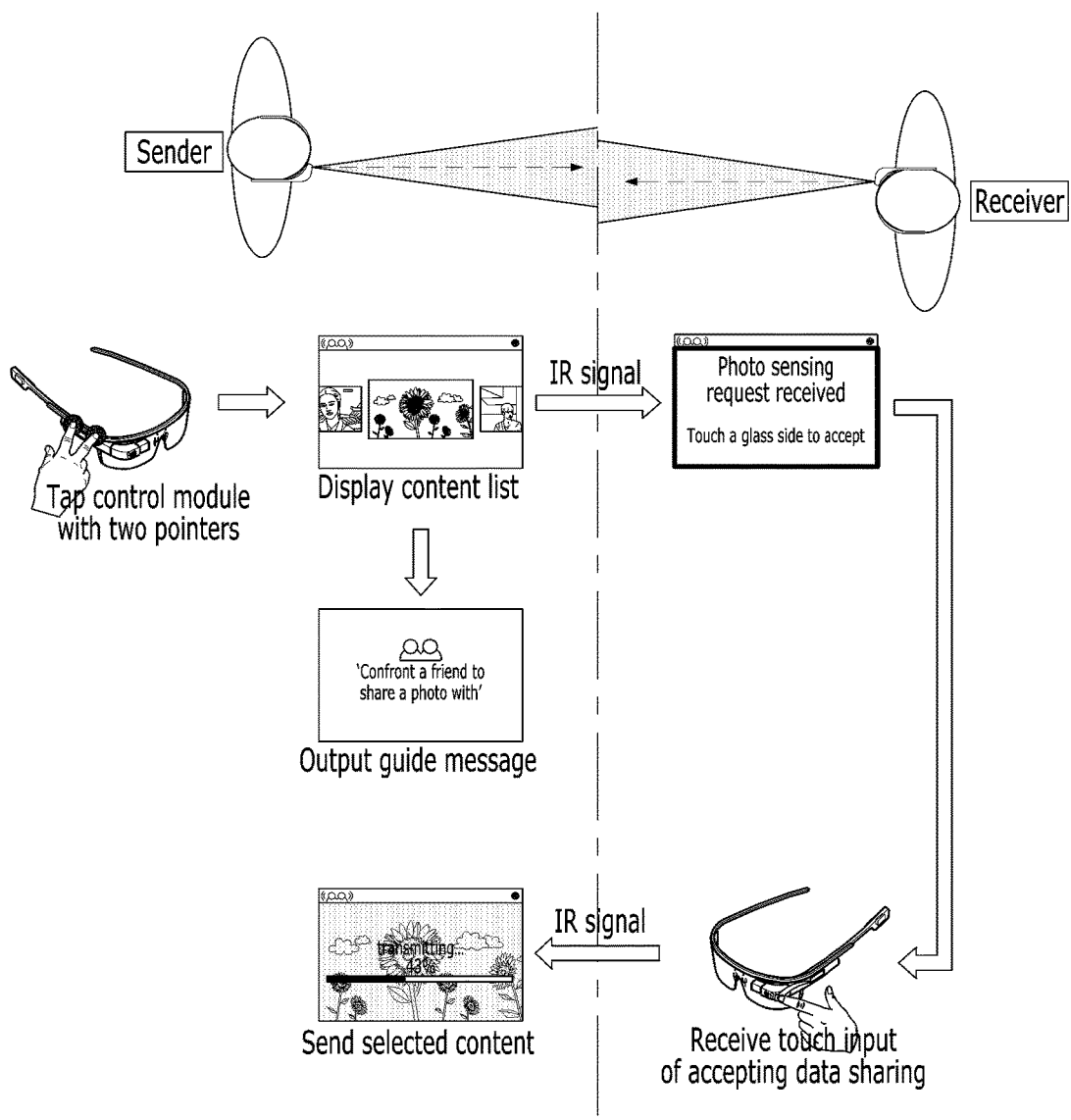
FIG. 10 is a diagram for an example that a mode of a first terminal is set to a share mode.

For instance, FIG. 10 is a diagram for an example that a mode of a first terminal is set to a share mode. If a user input for enabling a first terminal to enter a share mode is received, the first terminal may enter the share mode and control a content list, from which a content to be shared with a second terminal can be selected, to be outputted. In FIG. 10, as a user input for enabling the first terminal to enter the share mode, a control module is tapped using two pointers for example. And, it is a matter of course that a touch input other than the illustrated example can be set as a user input for enabling the first terminal to enter the share mode.

A user of the first terminal may determine a content to share with the second terminal from a content list.

For instance, a drag input to the control module may be provided to scroll a content list, and a tapping input to the control module may be provided to determine a prescribed selected one on the content list as a shared data.

If data to be shared with the second terminal is determined, as shown in FIG. 10, the first terminal outputs an IR signal may control a message, which guides to look at a mobile terminal to share data with, to be outputted.

As the first terminal confronts the second terminal, if the second terminal receives the IR signal, as mentioned in the foregoing description with reference to FIG. 3, a data sharing may be performed between the first terminal and the second terminal.

Through an image inputted through a camera, if a face of a user currently wearing the second terminal is recognized, the first terminal may automatically set a captured photo containing the recognized face as a shared data. This is described in detail with reference to FIG. 11.

Figure 11:
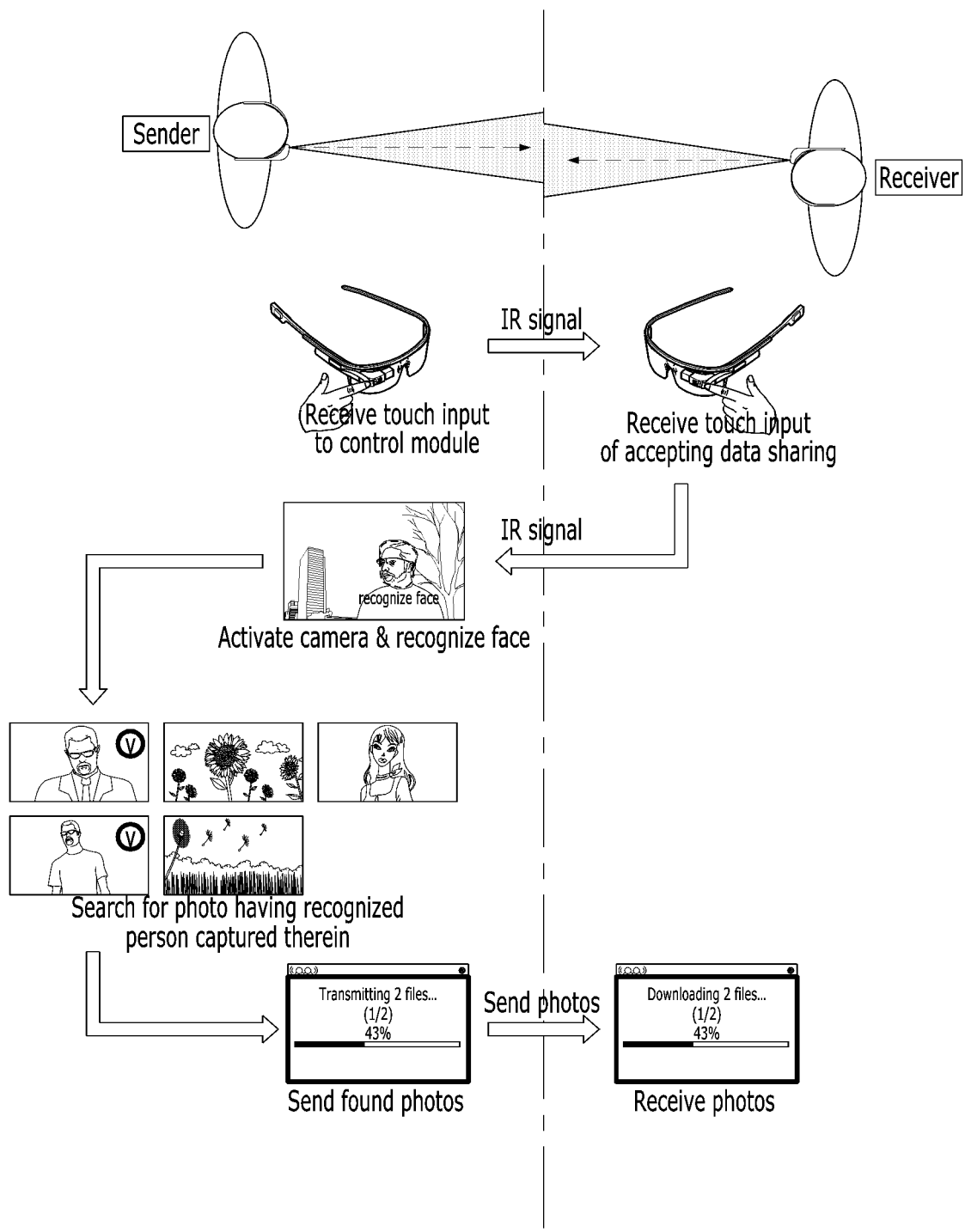
FIG. 11 is a diagram for an example that a captured photo of a counterpart recognized through a camera is set as a shared data.

FIG. 11 is a diagram for an example that a captured photo of a counterpart recognized through a camera is set as a shared data.

If a first camera receives a user input for intending to share data, it is able to output an IR signal. If a second terminal receives the IR signal and also receives a user input of accepting the data sharing, the first terminal may receive an IR signal outputted from the second terminal.

If receiving the IR signal outputted from the second terminal, the first terminal can turn on a camera. When the first terminal confronts the second terminal, the first terminal may receive the IR signal from the second terminal. When the first terminal and the second terminal confront each other, if the camera of the first terminal is activated, a user of the second terminal can be captured.

Subsequently, the first terminal analyzes an image inputted through the camera and is then able to determine a photo, in which a person identical to a recognized person is captured, as a shared data. For instance, in FIG. 11, 2 photos having the second terminal user captured therein among 5 photos are determined as shared data.

Thereafter, the first terminal deactivates the camera and is able to send the shared data to the second terminal.

The first terminal may automatically set a photo captured in a specific place as a shared data. This is described in detail with reference to FIG. 12.

Figure 12:
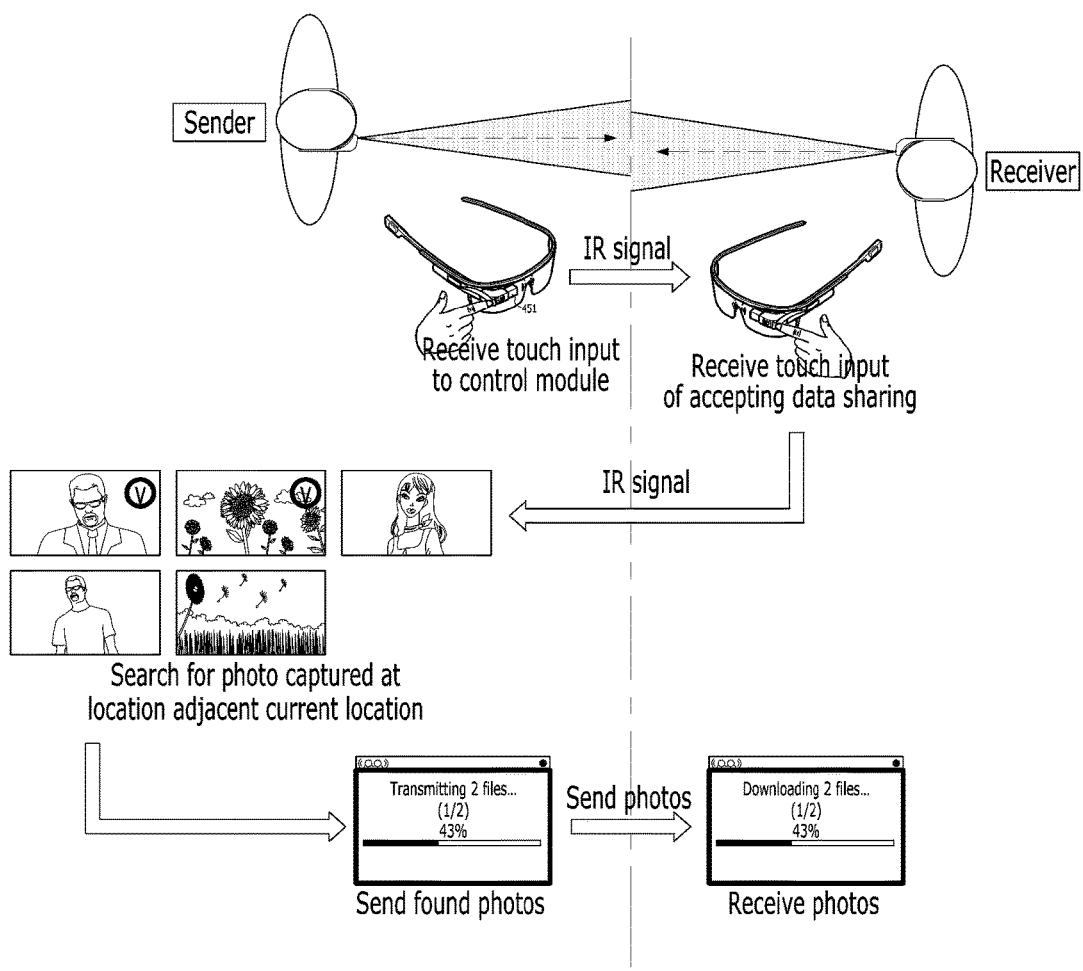
FIG. 12 is a diagram for an example that a photo captured in a specific place is set as a shared data.

FIG. 12 is a diagram for an example that a photo captured in a specific place is set as a shared data.

If a first camera receives a user input for intending to share data, it is able to output an IR signal. If a second terminal receives the IR signal and also receives a user input of accepting the data sharing, the first terminal may receive an IR signal outputted from the second terminal.

If receiving the IR signal outputted from the second terminal, the first terminal can determine a photo, which is captured at a location adjacent to a current location, as a shared data. For instance, if it is set to share a photo within a radius of 1 km, the first terminal can determine a photo, which is captured within 1 km from a current location as shared data. For instance, in FIG. 12, 2 of 5 photos are determined as the shared data.

Thereafter, the first terminal is able to send the shared data to the second terminal.

Once a start timing and an end timing are set, a mobile terminal according to the present invention may be able to set a content, which is created in-between, as a shared data. This is described in detail with reference to FIG. 13.

Figure 13:
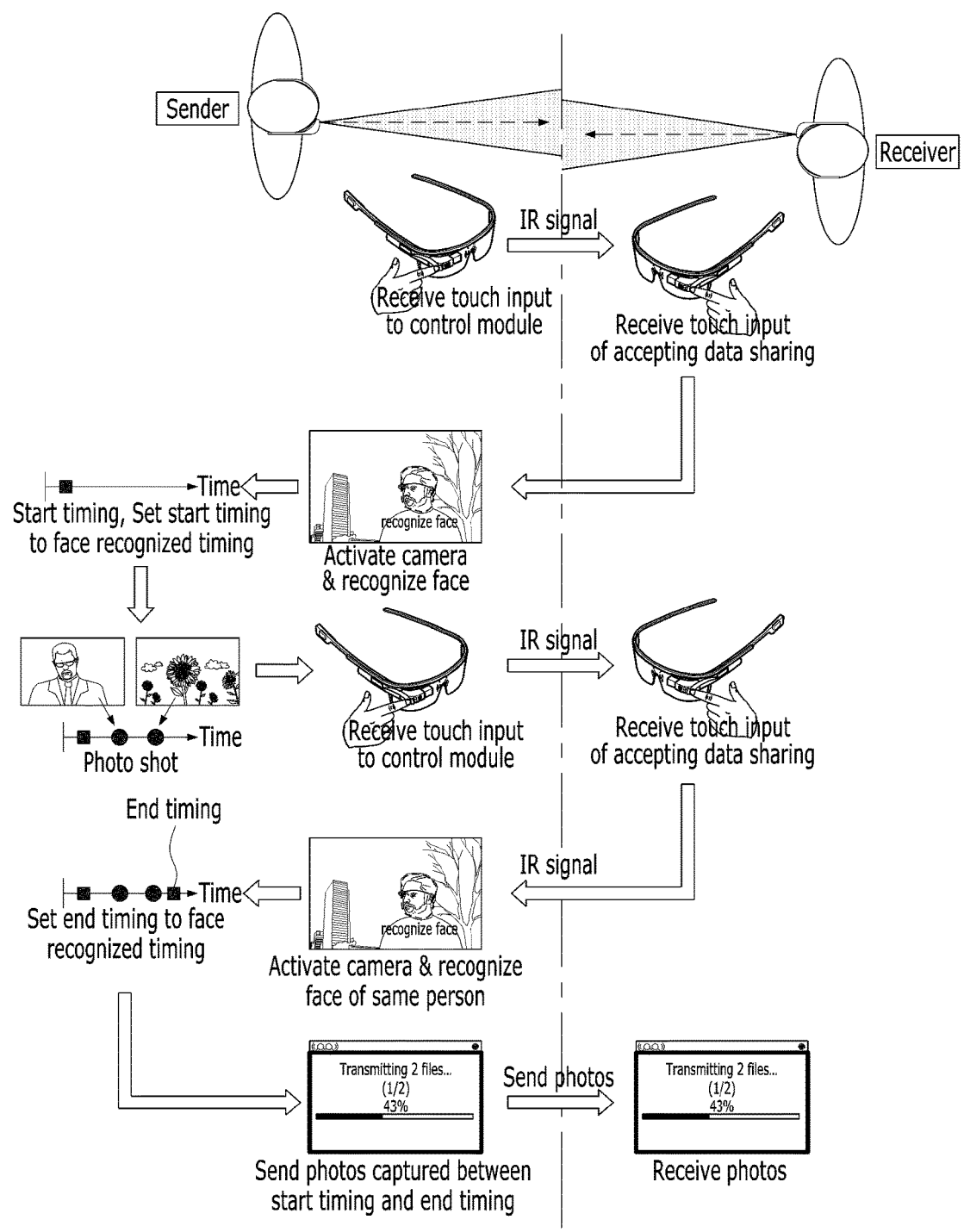
FIG. 13 is a diagram for an example that a photo captured in a specific period is set as a shared data.

FIG. 13 is a diagram for an example that a photo captured in a specific period is set as a shared data.

If a first camera receives a user input for intending to share data, it is able to output an IR signal. If a second terminal receives the IR signal, it is able to output an IR signal to deliver to the first terminal.

If receiving the IR signal outputted from the second terminal, the first terminal can activate a camera. The first terminal analyzes an image inputted through the camera, thereby being able to search for a presence or non-presence of a start timing associated with a recognized person. If the start timing associated with the recognized person does not exist, the first terminal sets a start timing to a timing of recognizing the person and is then able to save the start timing and the recognized person in a manner of associating the start timing and the recognized person with each other.

Thereafter, if a user input for intending to share data is received again through the first terminal, the first terminal may output an IR signal and then receive an IR signal from the second terminal in response to the outputted signal.

If receiving the IR signal outputted from the second terminal, the first terminal can activate the camera. The first terminal analyzes an image inputted through the camera, thereby being able to search for a presence or non-presence of a start timing associated with a recognized person. If the start timing associated with the recognized person exists, the first terminal may set the photos captured up to a current timing as shared data. In FIG. 13, 2 photos captured between a start timing and an end timing are set as the shared data for example.

Thereafter, the first terminal can send the shared data to the second terminal.

The first terminal may selects photos captured at locations adjacent to a current location from the photos captured between the start timing and the end timing only and then send the selected photos to the second terminal. For instance, if it is set to share photos within a radius of 1 km, the first terminal can send the photos captured within 1 km from a current location among the photos captured between the start timing and the end timing to the second terminal.

The first terminal may send photos, which were captured in a specific time slot or within a prescribed period from a current timing to the past, to the second terminal. For instance, when the first terminal captured photos at PM 1:30, PM 1:45, PM 3:00 and PM 3:30, if the second terminal makes a request for sending the photos captured in a time slot of PM 1, the first terminal may set the photo captured at PM 1:30 and the photo captured at PM 1:45 as shared data.

The first terminal and the second terminal may play a content stored in the first terminal together. To this end, the first terminal may send video data of encoding a real-time output of a display unit as data for reception or may send a content which is to be played by the second terminal as well.

Figure 14:
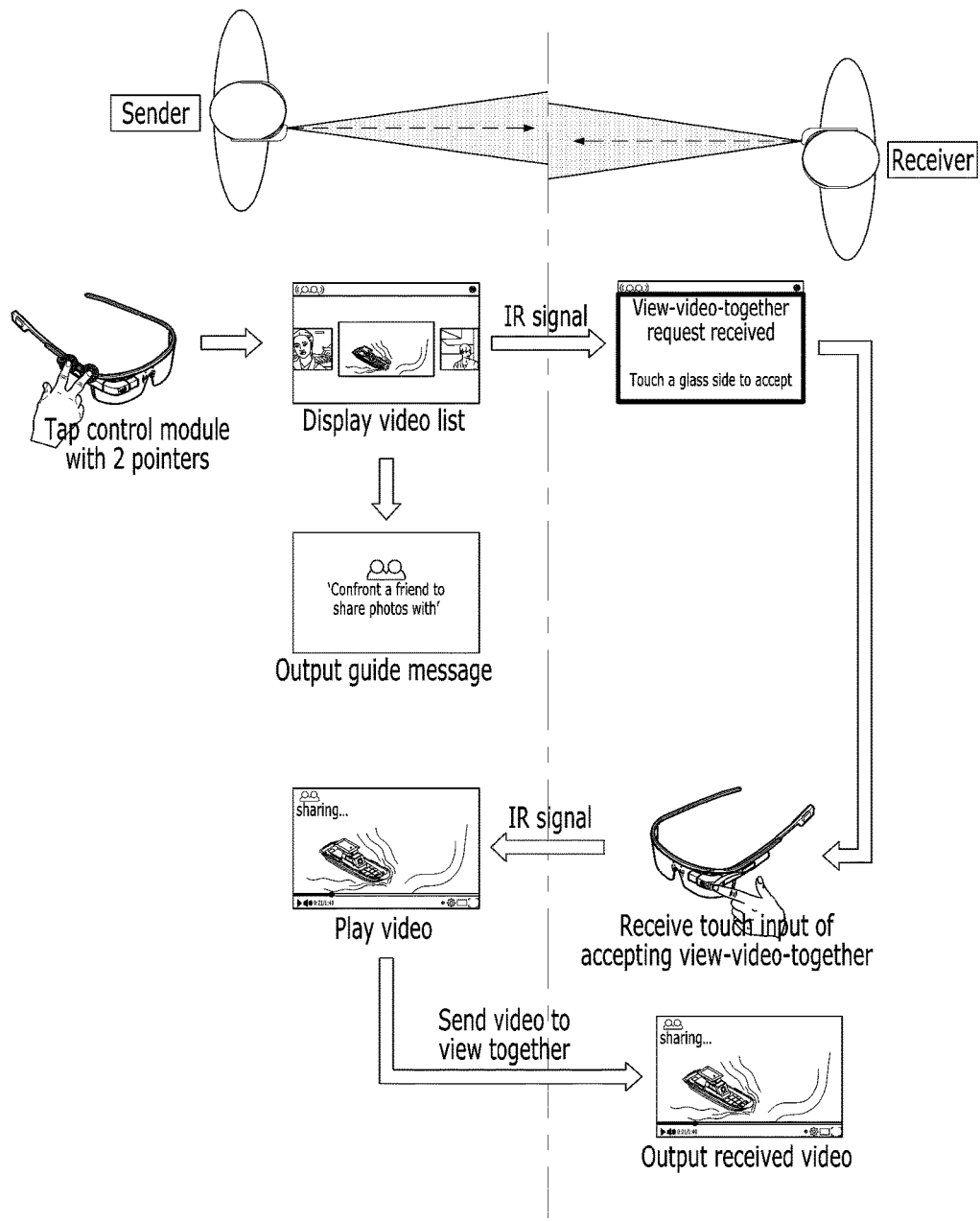
FIG. 14 is a diagram for an example that first and second terminals view the same content together.

For instance, FIG. 14 is a diagram for an example that first and second terminals view the same content together. For clarity of the description, a content to be played by both of the first terminal and the second terminal is assumed as a video.

If a user input for enabling the first terminal to enter a share mode is received, the first terminal may control a video list, from which a video desired to be viewed together with the second terminal, to be outputted.

A user of the first terminal may determine a video, which is desired to be viewed together with the second terminal, from the video list.

If the video to be viewed together with the second terminal is selected, the first terminal may output an IR signal. As mentioned in the foregoing description with reference to FIG. 9, the first terminal may output an IR signal in case that the second terminal enters a region, in which the second terminal is estimated to output an IR signal.

Thereafter, if an IR signal of accepting a video sharing is received from the second terminal, the first terminal plays a video and is able to send video data of encoding an output of a display unit to the second terminal.

For another instance, if an IR signal of accepting a video sharing is received from the second terminal, the first terminal plays a video and is able to send video in order to enable the second terminal to stream the video. While the second terminal streams the video, a user input for controlling a video play, which is inputted through the first terminal, can be valid for the second terminal. For instance if a user input for pausing the video is received, the first terminal pauses the video play and is able to send a video pause command to the second terminal.

Having received the pause command, the second terminal may pause the play of the video. Through this, users of the first terminal and the second terminal may appreciate the same view of the video.

On the contrary, it is a matter of course that a user input for controlling a video play, which is inputted through the second terminal, can be valid for the first terminal.

While the video is viewed, the first terminal and the second terminal may control indicators, which indicate that the video is viewed together with a counterpart, to be displayed.

While the second terminal confronts the first terminal, the first terminal can view a content together with the second terminal. In doing so, as the first terminal or the second terminal moves, if the first terminal and the second terminal fail to confront each other, the first terminal may end a view-video-together with the second terminal [cf. FIG. 5]. In doing so, if a preset gesture is inputted to the first terminal and the second terminal, although the first terminal and the second terminal fail to confront each other, the view-content-together may continue [cf. FIG. 6].

For another instance, if a distance between the first terminal and the second terminal is increased over a prescribed distance, the first terminal may end the view-content-together with the second terminal [cf. FIG. 7].

If the view-content-together is ended, the first terminal may send the content viewed together to the second terminal. This is described in detail with reference to FIG. 15.

Figure 15:
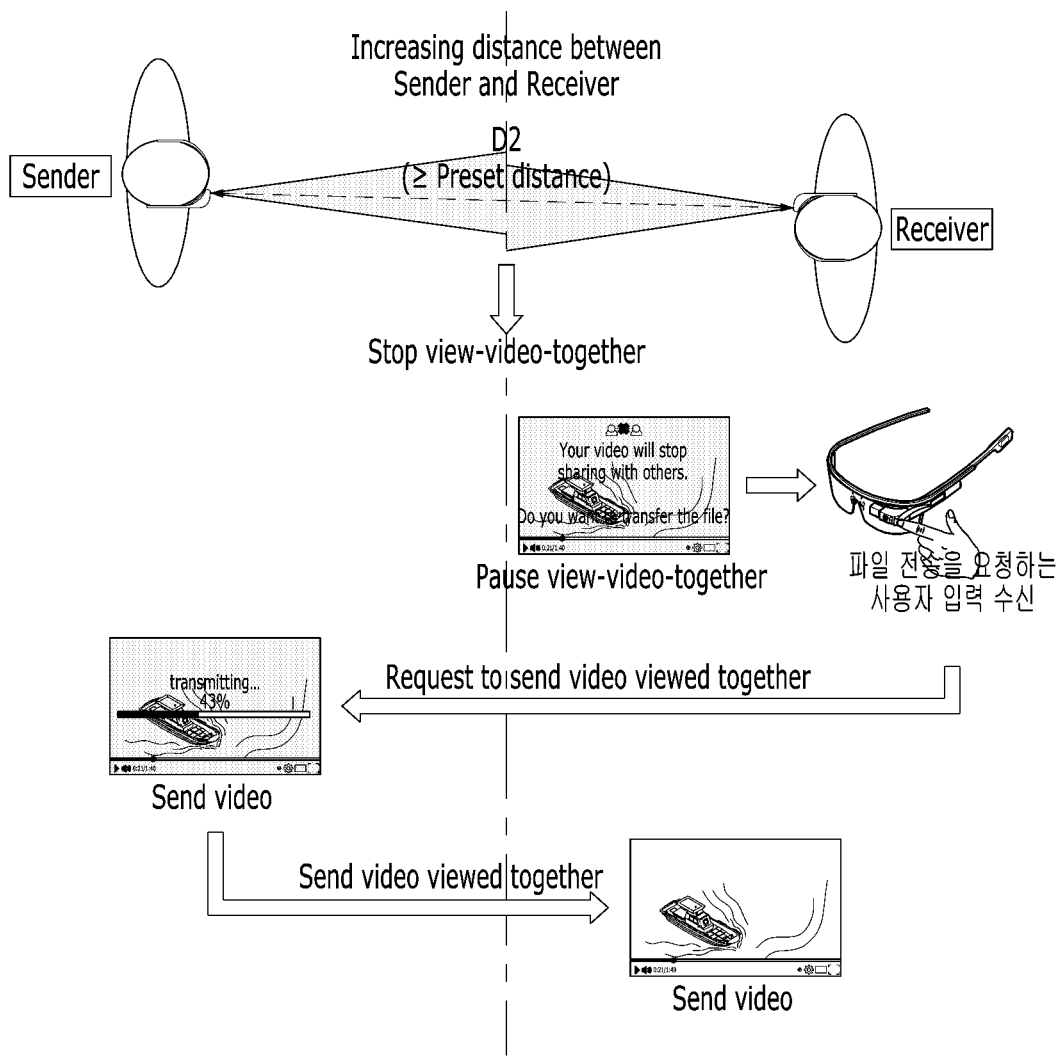
FIG. 15 is a diagram for an example that a first terminal send a content viewed together to a second terminal.

FIG. 15 is a diagram for an example that a first terminal send a content viewed together to a second terminal.

If a distance between the first terminal and the second terminal increases, the first terminal may end a view-content-together with the second terminal.

If the view-content-together is ended, the second terminal may control a message, which queries whether to download the content viewed together, to be outputted. If a user input for indenting to download the content viewed together is received, the second terminal may make a request for sending the content viewed together to the first terminal. In doing so, the request signal of the second terminal may be sent through an IR signal or a wireless communication channel (e.g., Bluetooth, Wi-Fi, etc.) between the first terminal and the second terminal.

Having received the request for sending the content viewed together from the second terminal, the first terminal may provide the content viewed together to the second terminal. If the content viewed together by the first terminal and the second terminal is a video, the first terminal may send a remaining quantity of the video except a quantity viewed together with the second terminal to the second terminal only.

If the content viewed together is received from the first terminal, the second terminal can output the received contents. If the content viewed together by the first terminal and the second terminal is a video, the second terminal may play the video by starting with the remaining quantity except the quantity viewed together.

According to the examples of the aforementioned embodiments, if receiving a user input for determining whether to accept a data sharing, the second terminal can output an IR signal at last. Unlike the described examples, the second terminal outputs an IR signal and may be then able to determine whether to receive a shared data depending on whether a user accepts a data sharing.

For instance, if the first terminal receives an IR signal outputted by the second terminal, the first terminal can wait for a reception of information indicating that a user of the second terminal accepts a data sharing from the second terminal. If receiving the information indicating that the data sharing is accepted from the second terminal, the first terminal can send the shared data to the second terminal at last.

For another instance, if the first terminal receives an IR signal outputted by the second terminal, the first terminal can directly send the shared data to the second terminal. The second terminal temporarily saves (i.e., buffers) the received shared data. If receiving a user input for accepting the data sharing, the second terminal saves the temporarily saved shared data. If receiving a user input for declining the data sharing, the second terminal can delete the temporarily saved shared data.

According to the aforementioned embodiments, for example, one of two mobile terminals sends data to share and the other receives the shared data. Unlike the example, each of the two mobile terminals can send the shared data to the other.

Figure 16:
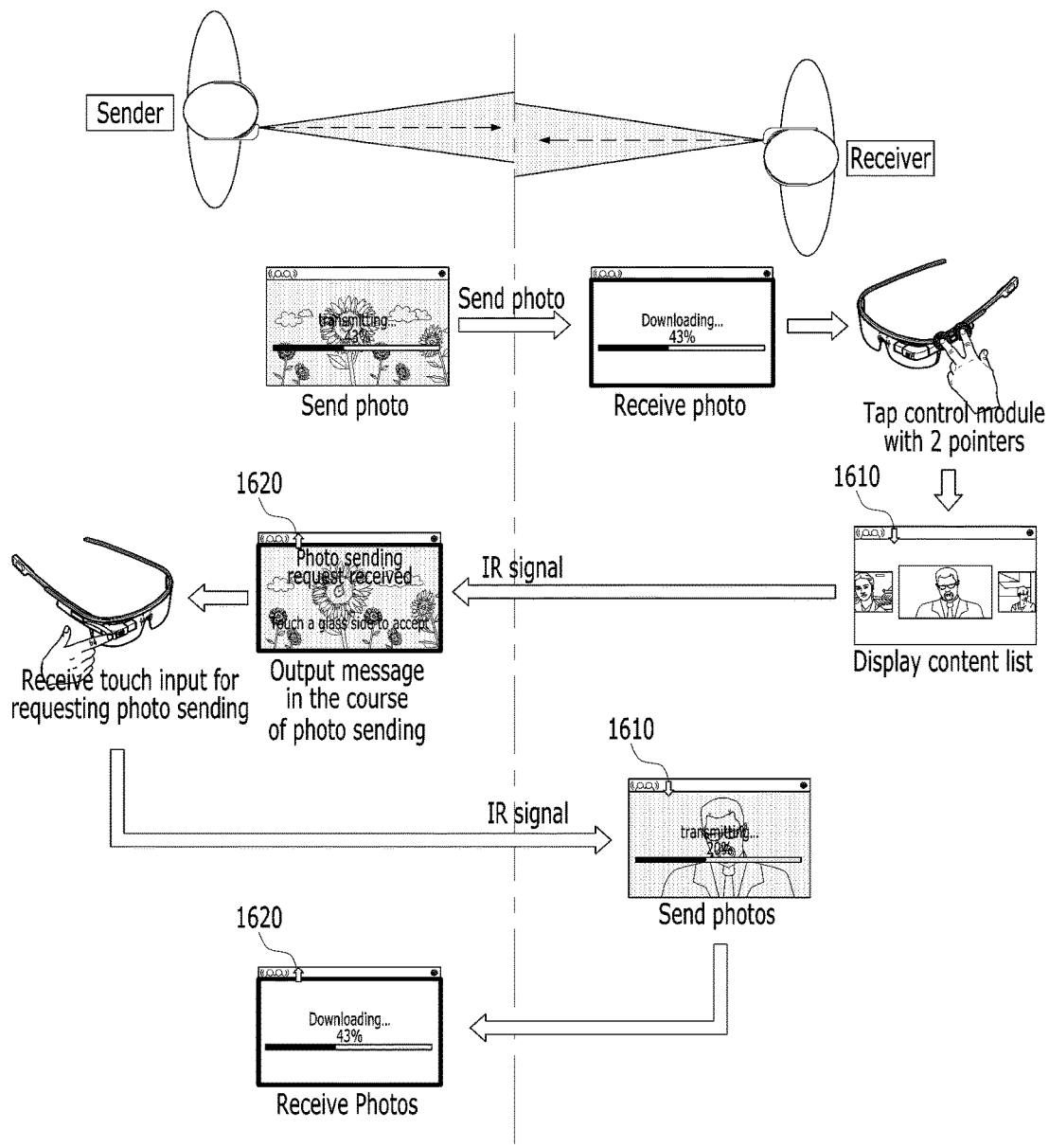
FIG. 16 is a diagram for an example that both mobile terminals send shared data to each other.

For instance, FIG. 16 is a diagram for an example that both mobile terminals send shared data to each other.

While reeving shared data from a first terminal or before receiving shared data from the first terminal, if receiving a user input for intending to enabling a second terminal to enter a share mode, the second terminal can display a content list of contents sharable with the first terminal. If the second terminal is receiving data from the first terminal, the second terminal displays the content list and is also able to control information, which indicates that the shared data is being received from the first terminal, to be outputted. According to the example shown in FIG. 16, the information indicating that data is being received is outputted as an indicator 1610 to a status display line.

If a content to be shared with the first terminal is selected from the content list, the second terminal may output an IR signal.

If the IR signal is received from the second terminal, the first terminal may control a message, which queries whether to receive data from the second terminal, to be outputted. While the message is outputted, the first terminal may control information, which indicates that data is being sent to the second terminal, to be outputted. According to the example shown in FIG. 16, the information indicating that the data is being sent is outputted as an indicator 1620 to a status display line.

Thereafter, if the first terminal receives a user input for receiving the data sharing, the first terminal may output an IR signal.

Having received the IR signal from the first terminal, the second terminal is able to send shared data to the first terminal while receiving shared data from the first terminal.

For another instance, if the reception of the shared data from the first terminal is completed, the second terminal may send shared data to the first terminal at last.

The first terminal and the second terminal may share contents corresponding to specific conditions with each other.

For instance, as mentioned in the foregoing description with reference to FIG. 13, once a start timing and an end timing are set, the first terminal sends a photo captured between the start timing and the end timing to the second terminal and may also receive a photo captured by the second terminal between the start timing and the end timing from the second terminal.

For another instance, the first terminal and the second terminal may share photos captured within a prescribed distance from a current location with each other only.

For another instance, the first terminal and the second terminal may share photos captured in the same time slot only by comparing time slots of captured photos. For instance, if the first terminal captures photos at PM 1:30, PM 1:45, PM 3:00 and PM 3:30 and the second terminal captures photos at PM 1:20, PM 1:50 and PM 2:10, the first terminal can send two photos (e.g., photo captured at PM 1:30 and photo captured at PM 1:45) captured in a time slot of PM 1 to the second terminal and the second terminal can send two photos (e.g., photo captured at PM 1:20 and photo captured at PM 1:50) captured in a time slot of PM 1 to the first terminal.

Since the second terminal fails to capture a photo in a time slot of PM 3, the photos captured by the first terminal at PM 3:00 and PM 3:30 can be excluded from the targets to be sent to the second terminal. Likewise, since the first terminal fails to capture a photo in a time slot of PM 2, the photo captured by the second terminal at PM 2:10 can be excluded from the targets to be sent to the first terminal.

The first terminal and the second terminal may set shared data to photos that meet at least two of the above-listed conditions: i) photo captured between a start timing and an end timing; ii) photo captured within a prescribed distance from a current location; and iii) photo captured in the same time slot of a photo captured by a counterpart terminal.

According to one embodiment of the present invention, the above-described method (operating flowchart) can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

The foregoing embodiments of the above-described mobile terminal 100 are merely exemplary and are not to be considered as limiting the present disclosure. The features, structures, methods, and other characteristics of the exemplary embodiments described herein may be combined in various ways to obtain additional and/or alternative exemplary embodiments.

INDUSTRIAL APPLICABILITY

The present invention is applicable to various electronic devices capable of infrared communications as well as to wearable devices.

What is claimed is:

1. A mobile terminal, comprising:
a wireless communication unit configured to perform wireless communication;
an IR (infrared) transceiver configured to transceive IR signals;
a user input unit configured to receive a user input;
a camera; and
a controller configured to:
activate the camera when receiving a first user input through the user input unit,
display a preview image based on the activated camera,
recognize a user wearing an external terminal and a region estimated to output an IR signal in the preview image,
control a first IR signal to be outputted through the IR transceiver when the user is in the region, and
control shared data to be sent to the external terminal through the wireless communication unit when receiving a second IR signal from the external terminal having received the first IR signal,
wherein the mobile terminal comprises a wearable device of a glass type.

2. The mobile terminal of claim 1, wherein the second IR signal includes communication information of the external terminal,
wherein the controller controls the wireless communication unit to establish a wireless communication channel with the external terminal based on the communication information of the external terminal, and
wherein if the wireless communication channel is established, the controller controls the shared data to be sent to the external terminal through the wireless communication channel.

3. The mobile terminal of claim 1, wherein if the wireless communication unit is connected to a plurality of external terminals, the controller determines a target for sending the shared data thereto based on identification information included in the second IR signal.

4. The mobile terminal of claim 1, wherein if a distance between the mobile terminal and the external terminal is equal to or smaller than a preset value, the controller sends the shared data to the external terminal.

5. The mobile terminal of claim 1, wherein if the shared data starts to be sent, the controller controls the IR transceiver to periodically output the first IR signal.

6. The mobile terminal of claim 1, wherein if the mobile terminal and the external terminal are spaced apart from each other over a preset value, the controller controls the shared data to stop being sent.

7. The mobile terminal of claim 1, wherein as the first user input is received through the user input unit, if the controller sends the shared data, the controller controls the shared data to be sent using a first wireless communication technology and wherein as a second user input is received through the user input unit, if the controller sends the shared data, the controller controls the shared data to be sent using a second wireless communication technology.

8. The mobile terminal of claim 1, wherein if a person is recognized from an image inputted through the camera, the controller sends a captured photo of the recognized person as the shared data to the external terminal.

9. The mobile terminal of claim 1, wherein the mobile terminal sends a photo, which is captured within a preset distance from a current location of the mobile terminal, as the shared data to the external terminal.

10. The mobile terminal of claim 1, wherein if a start timing and an end timing are set, the controller sends a content, which is created between the start timing and the end timing, as the shared data to the external terminal.

11. The mobile terminal of claim 1, wherein if a video is selected as the shared data, the controller plays the video and also controls the external terminal to play the video by streaming.

12. The mobile terminal of claim 5, wherein if failing to receive the second IR signal in response to the periodically outputted first IR signal, the controller controls the shared data to stop being sent.

13. The mobile terminal of claim 7, wherein each of the first user input and the second user input is received if a lateral side of glasses is touched.

14. The mobile terminal of claim 10, wherein the start timing comprises a timing of recognizing a prescribed person from an image inputted through the camera and
   wherein the end timing comprises a timing of re-recognizing the prescribed person from the image inputted through the camera.

15. The mobile terminal of claim 11, wherein if the video stops being played by the streaming in the external terminal, the controller sends data of a quantity failing to be played in the external terminal in a whole quantity of the video to the external terminal.

16. The mobile terminal of claim 12, wherein if receiving a second user input through the user input unit, the controller continues to send the shared data despite failing to receive the second IR signal in response to the periodically outputted first IR signal.

17. A method of controlling a mobile terminal, the method comprising:
   activating a camera when receiving a first user input through a user input unit;
   displaying a preview image based on the activated camera;
   recognizing a user wearing an external terminal and a region estimated to output an IR (infrared) signal in the preview image;
   controlling a first IR signal to be outputted through an IR transceiver when the user is in the region; and
   controlling shared data to be sent to the external terminal through a wireless communication unit when receiving a second IR signal from the external terminal having received the first IR signal,
   wherein the mobile terminal comprises a wearable device of a glass type.

* * * * *